(12) United States Patent
Hansen et al.

(10) Patent No.: US 12,061,451 B2
(45) Date of Patent: Aug. 13, 2024

(54) TARGET FUNCTION PRIORITIZATION OF CONTROL MODES FOR RENEWABLE ELECTRIC GENERATION RESOURCE AND CHARGE STORAGE DEVICE

(71) Applicant: 8ME NOVA, LLC, San Francisco, CA (US)

(72) Inventors: Lukas Mercer Hansen, El Dorado Hills, CA (US); Gautham Ramesh, Emeryville, CA (US); Finbar Sheehy, San Francisco, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 330 days.

(21) Appl. No.: 17/683,864

(22) Filed: Mar. 1, 2022

(65) Prior Publication Data

US 2023/0120165 A1 Apr. 20, 2023

Related U.S. Application Data

(60) Provisional application No. 63/257,897, filed on Oct. 20, 2021.

(51) Int. Cl.
*H02J 3/00* (2006.01)
*G05B 17/02* (2006.01)
(Continued)

(52) U.S. Cl.
CPC ............. *G05B 17/02* (2013.01); *H02J 3/004* (2020.01); *H02J 3/32* (2013.01); *H02J 3/381* (2013.01);
(Continued)

(58) Field of Classification Search
CPC ... G05B 17/02; H02J 3/004; H02J 3/32; H02J 3/381; H02J 2300/24; H02J 2300/28;
(Continued)

(56) References Cited

U.S. PATENT DOCUMENTS 5,929,538 A * 7/1999 O'Sullivan ............... H02J 7/34
307/64
7,058,552 B2 * 6/2006 Stothert ............... G05B 13/042
703/2

(Continued)

FOREIGN PATENT DOCUMENTS

CN 104616121 5/2015
CN 104767441 B 2/2018
(Continued)

OTHER PUBLICATIONS

JP Office Action dated Jan. 5, 2024 in Japanese Patent Application No. 2021-546335.
(Continued)

*Primary Examiner* — Christopher E. Everett
(74) *Attorney, Agent, or Firm* — Foley & Lardner LLP

(57) ABSTRACT

The present disclosure describes a method of operating a power plant, comprising: obtaining an energy production forecast for a forecast period; generating a plurality of simulation results associated with simulated operation of the power plant for the forecast period, wherein the plurality of simulation results are generated by simulating operation of the power plant using a plurality of control algorithms; assigning a score to each of the plurality of control algorithms based on the generated plurality of simulation results; selecting a control algorithm from the plurality of control algorithms for the forecast period based on the assigned score for the control algorithm; and operating the power plant in accordance with the control algorithm for a duration of the forecast period.

20 Claims, 24 Drawing Sheets

(51) Int. Cl.
*H02J 3/32* (2006.01)
*H02J 3/38* (2006.01)

(52) U.S. Cl.
CPC ....... *H02J 2300/24* (2020.01); *H02J 2300/28* (2020.01)

(58) Field of Classification Search
CPC .............. H02J 2203/20; H02J 2300/20; H02J 2300/22; H02J 3/466
See application file for complete search history.

(56) References Cited

U.S. PATENT DOCUMENTS

| | | | |
|---|---|---|---|
| 8,492,926 B2 | 7/2013 | Collins et al. | |
| 8,493,030 B2 | 7/2013 | Paice et al. | |
| 9,404,426 B2 | 8/2016 | Wichmann et al. | |
| 9,945,264 B2 | 4/2018 | Wichmann et al. | |
| 9,957,843 B2 | 5/2018 | Wichmann et al. | |
| 10,135,257 B1 | 11/2018 | Adolf et al. | |
| 10,944,282 B2 | 3/2021 | Malhotra et al. | |
| 11,050,259 B2 | 6/2021 | Sugeno et al. | |
| 11,641,177 B2 | 5/2023 | Hansen et al. | |
| 11,881,713 B1* | 1/2024 | Johnson | H02J 3/381 |
| 2003/0100974 A1* | 5/2003 | Alvarez | G05B 19/41885 700/286 |
| 2008/0228518 A1 | 9/2008 | Braziel et al. | |
| 2009/0295162 A1 | 12/2009 | Oohara et al. | |
| 2010/0314942 A1 | 12/2010 | Talkin et al. | |
| 2011/0001356 A1 | 1/2011 | Pollack | |
| 2011/0074338 A1 | 3/2011 | Wu | |
| 2011/0115303 A1 | 5/2011 | Baarman et al. | |
| 2012/0004783 A1 | 1/2012 | Lo et al. | |
| 2012/0228950 A1 | 9/2012 | Sakai | |
| 2013/0030784 A1* | 1/2013 | Viassolo | G06Q 10/00 703/18 |
| 2013/0054045 A1* | 2/2013 | Ramezani | B60L 58/10 700/297 |
| 2013/0166081 A1 | 6/2013 | Sanders et al. | |
| 2013/0272844 A1 | 10/2013 | Lobato Pena et al. | |
| 2014/0035374 A1* | 2/2014 | Oka | H02J 7/35 307/52 |
| 2014/0100671 A1 | 4/2014 | Losee et al. | |
| 2014/0129040 A1 | 5/2014 | Emadi et al. | |
| 2014/0149038 A1 | 5/2014 | Cronin et al. | |
| 2014/0210406 A1 | 7/2014 | Na et al. | |
| 2014/0214219 A1 | 7/2014 | Katayama et al. | |
| 2014/0257585 A1 | 9/2014 | Kubota et al. | |
| 2014/0312833 A1 | 10/2014 | Won et al. | |
| 2015/0091386 A1 | 4/2015 | Nagamine et al. | |
| 2015/0095115 A1 | 4/2015 | Hyde et al. | |
| 2015/0095116 A1 | 4/2015 | Hyde et al. | |
| 2015/0184550 A1* | 7/2015 | Wichmann | G05B 13/04 700/287 |
| 2015/0185716 A1* | 7/2015 | Wichmann | F02C 9/28 700/287 |
| 2015/0278968 A1 | 10/2015 | Steven et al. | |
| 2016/0006245 A1 | 1/2016 | Chow | |
| 2016/0006289 A1 | 1/2016 | Sever et al. | |
| 2016/0261115 A1* | 9/2016 | Asati | H02J 3/14 |
| 2016/0323736 A1 | 11/2016 | Donahue et al. | |
| 2016/0344204 A1 | 11/2016 | Steffes et al. | |
| 2016/0380466 A1 | 12/2016 | Yang et al. | |
| 2017/0005515 A1 | 1/2017 | Sanders et al. | |
| 2017/0085114 A1 | 3/2017 | Gao et al. | |
| 2017/0102675 A1 | 4/2017 | Drees | |
| 2017/0141582 A1 | 5/2017 | Adolf et al. | |
| 2017/0141583 A1 | 5/2017 | Adolf et al. | |
| 2017/0146608 A1 | 5/2017 | Lee et al. | |
| 2017/0170684 A1 | 6/2017 | Matthey | |
| 2017/0179768 A1 | 6/2017 | Jurok | |
| 2017/0222438 A1 | 8/2017 | Magne et al. | |
| 2017/0308968 A1 | 10/2017 | Zhou et al. | |
| 2017/0331325 A1 | 11/2017 | Ristau | |
| 2017/0358929 A1 | 12/2017 | Koeppe et al. | |
| 2018/0012337 A1 | 1/2018 | Puetter | |
| 2018/0046160 A1 | 2/2018 | Chen et al. | |
| 2018/0115024 A1 | 4/2018 | Sugeno et al. | |
| 2018/0159184 A1 | 6/2018 | Nishida et al. | |
| 2018/0276768 A1 | 9/2018 | Mori et al. | |
| 2019/0011970 A1 | 1/2019 | Youn et al. | |
| 2019/0020196 A1 | 1/2019 | Poon | |
| 2019/0039467 A1 | 2/2019 | Hortop et al. | |
| 2019/0280532 A1 | 9/2019 | Matsuo et al. | |
| 2020/0014210 A1 | 1/2020 | Arnold et al. | |
| 2020/0211128 A1 | 7/2020 | Henri et al. | |
| 2021/0281077 A1 | 9/2021 | Cai et al. | |

FOREIGN PATENT DOCUMENTS

| | | |
|---|---|---|
| EP | 3 921 914 A1 | 12/2021 |
| JP | 2014-140281 A | 7/2014 |
| JP | 2016-220450 | 12/2016 |
| WO | WO-2013/102894 A1 | 7/2013 |
| WO | WO-2018/156700 A1 | 8/2018 |
| WO | WO-2020/163749 A1 | 8/2020 |

OTHER PUBLICATIONS

KR Office Action dated Apr. 16, 2024 in Japanese Patent Application No. 10-2021-7028209.
PCT International Prelim. Report on Patentability and Written Opinion dated May 2, 2024 in International Application No. PCT/US2022/037328.

* cited by examiner

| PRIORITY | 0 | 1 | 2 | Basepoint |
|---|---|---|---|---|
| MODE | Staging | CCD | APS | Net output |
| 50 MW | | | | |
| 40 MW | Max | Max | | |
| 30 MW | | | | |
| 20 MW | | | | |
| 10 MW | | | | |
| 0 MW | | | Max | |
| -10 MW | | | Ideal | |
| -20 MW | | Ideal | Min | Ideal (-20MW) |
| -30 MW | Min | Min | | |
| -40 MW | | | | |
| -50 MW | | | | |

| PRIORITY | 0 | 1 | 2 | Basepoint |
|---|---|---|---|---|
| MODE | Staging | CCD | APS | Net output |
| 50 MW | | | | |
| 40 MW | Max | | Max | |
| 30 MW | | | Ideal | |
| 20 MW | | Max | | |
| 10 MW | | | | |
| 0 MW | | Ideal | | Ideal (0MW) |
| -10 MW | | | | |
| -20 MW | | Min | | |
| -30 MW | Min | | Min | |
| -40 MW | | | | |
| -50 MW | | | | |

*FIG. 7B*

| PRIORITY | 0 | 1 | 2 | Basepoint |
|---|---|---|---|---|
| MODE | Staging | CCD | APS | Net output |
| 50 MW | | | | |
| 40 MW | Max | | Max | |
| 30 MW | | Max | Ideal | |
| 20 MW | | | | |
| 10 MW | | | Min | Ideal (10MW) |
| 0 MW | | Ideal | | |
| -10 MW | | | | |
| -20 MW | | Min | | |
| -30 MW | Min | | | |
| -40 MW | | | | |
| -50 MW | | | | |

*FIG. 7C*

| PRIORITY | 0 | 1 | 2 | Basepoint |
|---|---|---|---|---|
| MODE | Staging | CCD | APS | Net output |
| 50 MW | | | | |
| 40 MW | Max | Max | | |
| 30 MW | | | | |
| 20 MW | | Ideal | | |
| 10 MW | | Min | Max | Ideal (10MW) |
| 0 MW | | | Ideal | |
| -10 MW | | | Min | |
| -20 MW | | | | |
| -30 MW | Min | | | |
| -40 MW | | | | |
| -50 MW | | | | |

*FIG. 7D*

| PRIORITY | 0 | 1 | 2 | Basepoint |
|---|---|---|---|---|
| MODE | Staging | CCD | APS | Net output |
| 50 MW | | | | |
| 40 MW | Max | | | |
| 30 MW | | Max | | |
| 20 MW | | | | |
| 10 MW | | Ideal | | |
| 0 MW | | Min | | Ideal (0MW) |
| -10 MW | | | Max | |
| -20 MW | | | Ideal | |
| -30 MW | Min | | Min | |
| -40 MW | | | | |
| -50 MW | | | | |

*FIG. 7E*

| | $t_{6:00}$ | $t_{6:30}$ | $t_{7:00}$ | $t_{7:30}$ | $t_{8:00}$ | $t_{8:30}$ |
|---|---|---|---|---|---|---|
| Staging (0) | 0 | 0 | 0 | 0 | 0 | 0 |
| CCD (1) | 1 | 1 | 4 | 2 | 4 | 3 |
| APS (2) | 3 | 3 | 3 | 3 | 3 | 1 |
| AGC (3) | 2 | 2 | 1 | 1 | 1 | 2 |
| FWC (4) | 4 | 4 | 2 | 4 | 2 | 4 |

FIG. 15

Power delivered to the Point of Interconnection (POI)

| Power delivered to the POI | Value ($/MW per hour) |
|---|---|
| >100 MW | ($10,000,000) |
| 20-100 MW | 0 |
| <20 MW | ($5,000,000) |

FIG. 16A

BESS SOC AT 18:00

| BESS SOC (% of maximum charge) at 18:00 | Value |
|---|---|
| 95% - 100% | $0 |
| 94% | ($10,000) |
| 93% | ($25,000) |
| 92% | ($45,000) |
| 91% | ($70,000) |
| 90% | ($100,000) |
| <90% | ($150,000) |

FIG. 16B

BESS SOC AT 22:00

| BESS SOC (% of maximum charge) at 18:00 | Value |
|---|---|
| 0% - 10% | $0 |
| 11% | ($10,000) |
| 12% | ($25,000) |
| 13% | ($45,000) |
| 14% | ($70,000) |
| 15% | ($100,000) |
| >15% | ($150,000) |

FIG. 16C

Power delivered to the POI has differing values at different times of day, as follows:

| Start time | End time | Value ($/MWh) |
|---|---|---|
| 00:00 | 05:59 | $5 |
| 06:00 | 09:00 | $40 |
| 09:00 | 19:00 | $5 |
| 19:00 | 22:00 | $80 |
| 22:00 | 00:00 | $15 |

FIG. 16D

TARGET FUNCTION PRIORITIZATION OF CONTROL MODES FOR RENEWABLE ELECTRIC GENERATION RESOURCE AND CHARGE STORAGE DEVICE

CROSS-REFERENCE TO RELATED PATENT APPLICATIONS

This application claims the benefit of priority to U.S. Provisional Application No. 63/257,897, filed Oct. 20, 2021, the entirety of which is incorporated by reference herein.

TECHNICAL FIELD

Subject matter herein relates to methods for controlling renewable electrical energy generation resources and associated electrical energy charge storage devices in a coordinated fashion, such as for supplying an aggregated power output to an electrical grid.

BACKGROUND

A substantial increase of renewable electric generation resources, such as solar photovoltaic (PV) and wind power generators, has taken place in recent years. The unsteady nature of solar and wind generation due to natural and meteorological conditions can result in network frequency and voltage deviations. As renewable electric generation resources start to provide a greater percentage of electrical supply and displace traditional base-load electrical generation units such as coal-fired and nuclear-powered units, technical challenges are introduced, such as grid interconnection, power quality, reliability, stability, protection, and generation dispatch and control. The intermittent nature of solar and wind generation and rapid fluctuation in their output make energy storage devices (such as a battery energy storage system (BESS)) attractive to enhance compatibility with electrical grids.

Co-locating renewable electric generation and electrical energy storage devices may provide cost savings by reducing costs related to site preparation, land acquisition, permitting, interconnection, installation labor, hardware, and overhead. Additionally, tax savings may result, typically if the electrical energy storage devices are subject to being charged exclusively from on-site renewable electric generation resources.

Various considerations may affect utilization of a BESS. Lithium-based batteries can degrade at an accelerated rate when at or near a full charge capacity. Grid operators seeking to dispatch an integrated renewable electric generation and charge storage facility may require attainment of specific battery state of charge (SOC) conditions at particular times in a given day (with SOC being generally defined as the percentage of the full capacity of a battery that is still available for further discharge). Once a battery is at 100% SOC, it is also unable to absorb rapid increases in electric power output of an associated renewable electric generation resource, such that any excess power generation not able to be accepted by an electrical grid may undesirably need to be dissipated as heat or by clipping in a power inverter.

SUMMARY

In some aspects, the present disclosure describes method of operating a power plant. The method may include obtaining an energy production forecast for a forecast period; generating a plurality of simulation results associated with simulated operation of the power plant for the forecast period, wherein the plurality of simulation results are generated by simulating operation of the power plant using a plurality of control algorithms; assigning a score to each of the plurality of control algorithms based on the generated plurality of simulation results; selecting a control algorithm from the plurality of control algorithms for the forecast period based on the assigned score for the control algorithm; and operating the power plant in accordance with the control algorithm for a duration of the forecast period. In some embodiments, assigning the score to each of the plurality of control algorithms comprises calculating the score for each of the plurality of control algorithms based on one or more variables associated with (i) one or more operating parameters of the power plant and/or (ii) energy market prices.

In some embodiments, the method further includes comparing the assigned scores between each of the plurality of control algorithms; and assigning priorities to each of the plurality of control algorithms based on the assigned scores. In some embodiments, selecting the control algorithm comprises selecting the control algorithm responsive to the control algorithm having a highest priority of the assigned priorities.

In some embodiments, the plurality of control algorithms comprises a synthetic control algorithm, the synthetic control algorithm comprising stacked control modes having a priority order. In some embodiments, the energy production forecast is based on one or more variables associated with (i) one or more operating parameters of the power plant and/or (ii) energy market prices. In some embodiments, the obtaining, generating, assigning, selecting, and operating are performed at a first time point.

In some embodiments, the obtaining, generating, assigning, selecting, and operating are repeated at a second time point that is subsequent to the first time point. In some embodiments, selecting the control algorithm at the second time point comprises updating the selection of the control algorithm from the control algorithm selected at the first time point, wherein operating the power plant at the second time point comprises operating the power plant in accordance with the updated selection of the control algorithm. In some embodiments, operating the power plant comprises operating the power plant in accordance with the selected control algorithm after the first time point and before the second time point, without requiring additional energy production forecasting or generation of additional simulation results.

In some embodiments, the method further includes generating a graphical user interface (GUI) that permits a user to view the plurality of scores for the plurality of control algorithms; and receiving a selection from the plurality of control algorithms as the control algorithm for operating the power plant. In some embodiments, selecting the control algorithm comprises selecting the control algorithm responsive to determining the control algorithm has a highest score of the plurality of scores. In some embodiments, the method further includes comparing the assigned score of the control algorithm to a threshold, wherein selecting the control algorithm comprises selecting the control in response to determining the control algorithm exceeds the threshold.

In some embodiments, the power plant is a renewable energy power plant that comprises (i) a renewable electrical energy generation resource and (ii) an electrical energy storage device that is configured to be charged with electric power produced by the renewable electrical energy generation resource and to discharge the electric power to an electric grid. In some embodiments, the method further includes calculating the plurality of scores using an optimization function, wherein selecting the control algorithm comprises selecting the control algorithm to maximize the optimization function. In some embodiments, the optimization function comprises an economic forecast comprising of production and/or price forecasts.

In some embodiments, the optimization function comprises operational forecasts relating to degradation of an electrical energy storage device at the power plant over time. In some embodiments, the optimization function is based on one or more characteristics of an electrical energy storage device at the power plant, wherein the one or more characteristics comprise an energy storage type, efficiency level, or degradation behavior of the electrical energy storage device. In some embodiments, assigning the score to each of the plurality of control algorithms comprises generating scores for the plurality of control algorithms based on a set of scoring criteria comprising one or more of the following: (i) a first scoring criterion based on an amount of energy or power delivered to a point of measurement; (ii) a second scoring criterion based on a state of charge of an electrical energy storage device at the power plant; or (iii) a third scoring criterion based on minimizing degradation or operating costs of the electrical energy storage device.

In another aspect, the present disclosure describes a system. The system may include one or more computer processors operatively coupled to computer memory, wherein the one or more computer processors are configured by machine-readable instructions to obtain an energy production forecast for a forecast period; generate a plurality of simulation results associated with simulated operation of the power plant for the forecast period, wherein the plurality of simulation results are generated by simulating operation of the power plant using a plurality of control algorithms; assign a score to each of the plurality of control algorithms based on the generated plurality of simulation results; select a control algorithm from the plurality of control algorithms for the forecast period based on the assigned score for the control algorithm; and operate the power plant in accordance with the control algorithm for a duration of the forecast period.

In yet another aspect, the present disclosure describes one or more non-transitory computer storage media storing instructions that are operable, when executed by one or more computers, to cause said one or more computers to perform operations comprising obtaining an energy production forecast for a forecast period; generating a plurality of simulation results associated with simulated operation of the power plant for the forecast period, wherein the plurality of simulation results are generated by simulating operation of the power plant using a plurality of control algorithms; assigning a score to each of the plurality of control algorithms based on the generated plurality of simulation results; selecting a control algorithm from the plurality of control algorithms for the forecast period based on the assigned score for the control algorithm; and operating the power plant in accordance with the control algorithm for a duration of the forecast period.

In yet another aspect, the present disclosure describes a method of operating a power plant, comprising: (a) obtaining an energy production forecast for a forecast period; (b) generating a plurality of simulation results associated with simulated operation of the power plant for the forecast period, wherein the plurality of simulation results are generated by executing a plurality of control algorithms in a virtual environment; (c) assigning a score to each simulation result and corresponding control algorithm, to thereby generate a plurality of scores for the plurality of simulation results and the plurality of control algorithms; (d) selecting an optimal control algorithm for the forecast period, based at least on the energy production forecast and a ranking of the plurality of scores; and (e) operating the power plant in accordance with the optimal control algorithm for a duration of the forecast period.

In some embodiments, the plurality of control algorithms comprises synthetic control algorithms.

In some embodiments, the synthetic control algorithms comprise stacked control modes having a priority order.

In some embodiments, the energy production forecast is based on one or more variables associated with (i) one or more operating parameters of the power plant and/or (ii) energy market prices.

In some embodiments, (a) through (e) are performed at a first time point.

In some embodiments, (a) through (e) are repeated at a second time point that is subsequent to the first time point.

In some embodiments, (a) through (e) are repeated at the second time point in order to update the selection of the optimal control algorithm in (d), and to operate the power plant in (e) in accordance with the updated selection of the optimal control algorithm.

In some embodiments, the power plant is operated in accordance with the selected optimal control algorithm after the first time point and before the second time point, without requiring additional energy production forecasting or generation of additional simulation results.

In some embodiments, the first time point and the second time point are spaced apart by an interval.

In some embodiments, the interval ranges from about 1 hour to about 24 hours.

In some embodiments, the interval ranges from about 1 day to about 3 days.

In some embodiments, the method further comprises providing a graphical user interface (GUI) that permits a user (i) to view the plurality of scores and (ii) to select one or more of the control algorithms as the optimal control algorithm for operating the power plant.

In some embodiments, the method further comprises receiving an input from the user via the GUI, wherein the input comprises a selection of the optimal control algorithm.

In some embodiments, in (d), the control algorithm having the highest score based on the simulation results is selected to be the optimal control algorithm.

In some embodiments, the optimal control algorithm selected in (d) has a score that is at or above a threshold score.

In some embodiments, the power plant is a renewable energy power plant.

In some embodiments, the renewable energy power plant comprises (i) a renewable electrical energy generation resource and (ii) an electrical energy storage device that is configured to be charged with electric power produced by the renewable electrical energy generation resource and to discharge the electric power to an electric grid.

In some embodiments, the plurality of scores are generated by an optimization function, and wherein the optimal control algorithm is selected in order to maximize the optimization function.

In some embodiments, the optimization function comprises an economic forecast comprising of production and/or price forecasts.

In some embodiments, the optimization function comprises operational forecasts relating to degradation of an electrical energy storage device at the power plant over time.

In some embodiments, the optimization function is based on one or more characteristics of an electrical energy storage device at the power plant, wherein the one or more characteristics comprise an energy storage type, efficiency level, or degradation behavior of the electrical energy storage device.

In some embodiments, the plurality of scores are generated in (c) based on a set of scoring criteria comprising one or more of the following: (i) a first scoring criterion based on an amount of energy or power delivered to a point of measurement; (ii) a second scoring criterion based on a state of charge of an electrical energy storage device at the power plant; or (iii) a third scoring criterion based on minimizing degradation or operating costs of the electrical energy storage device.

In some aspects, the present disclosure describes a method for controlling a renewable power plant comprising (i) a renewable electrical energy generation resource and (ii) an electrical energy storage device configured to discharge electric power to an electrical grid and chargeable with electric power produced by the renewable electrical energy generation resource, the method comprising: (a) determining one or more control modes for controlling a charge/discharge rate of the electrical energy storage device, wherein each control mode comprises a set of control signal candidate values in a range from an upper bound value to a lower bound value; (b) receiving a first set of signals; (c) based at least in part on the first set of signals, determining an initial priority order of the one or more control modes and controlling the charge/discharge rate of the electrical energy storage device in accordance with the initial priority order; (d) receiving a second set of signals; and (e) based at least in part on the second set of signals, determining a second priority order for the one or more control modes and controlling the charge/discharge rate of the electrical energy storage device in accordance with the second priority order.

In some embodiments, the one or more control modes comprises a plurality of control modes.

In some embodiments, the first set of signals comprises a signal indicative of a first target function of the renewable power plant and the second set of signals comprises a signal indicative of a second target function of the renewable power plant.

In some embodiments, the first set of signals and the second set of signals comprise a signal indicative of reaching a predetermined state of charge of the energy storage system by a predetermined time of day.

In some embodiments, the first set of signals and the second set of signals comprise a signal indicative of delivering a predetermined amount of energy during a predetermined time period of day.

In some embodiments, the first set of signals and the second set of signals comprise a signal indicative of a state or an operating parameter of the renewable electrical energy generation resource, the electrical energy storage device, or the electrical grid.

In some embodiments, the first set of signals and the second set of signals comprise a signal indicative of a weather condition.

In some embodiments, the first set of signals and the second set of signals comprise a signal indicative of a forecast.

In some embodiments, the first priority order and the second priority order maximize a value of a target function of the renewable power plant, wherein the signal is an input to the target function.

In some embodiments, controlling charge/discharge rate of the electrical energy storage device comprises communicating a control signal to the electrical energy storage device, comprising: (a) choosing a common candidate value that is common to each of the set of control signal candidate values from the one or more control modes; (b) if the common candidate value does not exist, then choosing a value from the set of control signal candidate values of the control mode comprising the highest priority value from the one or more control modes.

In some embodiments, controlling charge/discharge rate of the electrical energy storage device comprises communicating a control signal to the electrical energy storage device, comprising: (a) choosing a common candidate value that is common to each of the set of control signal candidate values from the one or more control modes; (b) if the common candidate value does not exist, then excluding the lowest priority control mode from the one or more control modes, then repeating (a).

In some embodiments, the method comprises repeating (a) and (b) until the common value candidate value is chosen.

In some embodiments, choosing the common candidate value maximizes an optimization objective function.

In some embodiments, determining the second priority order comprises varying the initial priority order to maximize an optimization objective function to determine the second priority order.

In some embodiments, the method further comprises an optimization algorithm that is configured to vary the initial priority order to maximize the optimization objective function utilizing at least one of: (i) a Monte Carlo algorithm; (ii) an evolutionary algorithm; and (iii) a deterministic algorithm.

In some embodiments, the optimization objective function comprises a set of scoring criteria.

In some embodiments, the set of scoring criteria comprises at least one of (i) a scoring criteria based on the amount of energy delivered to a point of interconnection; (ii) a scoring criteria based on the amount of power delivered to a point of interconnection; and (iii) a scoring criteria based on a SOC of the electrical energy storage device.

In some embodiments, the plurality of control modes comprises at least a staging mode and at least two of (i) a Coordinated Charge Discharge (CCD) mode; (ii) an Active Power Smoothing (APS) mode; (iii) an Automatic Generation Control (AGC) mode; and (iv) a Frequency-Watt Curve (FWC) mode.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Other aspects, features, and embodiments of the present disclosure will be more fully apparent from the ensuing disclosure and appended claims.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

This application is related to a co-pending patent application having Ser. No. 17/186,216 which is incorporated herein by reference in its entirety.

BRIEF DESCRIPTION OF DRAWINGS

The accompanying drawings incorporated in and forming a part of this specification illustrate several aspects of the disclosure, and together with the description serve to explain the principles of the disclosure.

FIG. 6 is a first diagram illustrating a serial (or stacking) arrangement of different control modes, with each control mode including multiple control signal candidate values, and with the serially connected control modes configured to produce a basepoint signal useable as a single active power command, in accordance with some embodiments.

FIGS. 7A-7E embody tables identifying control signal candidate values for multiple serially connected control modes and a net output value according to different examples, in accordance with some embodiments.

FIG. 15 illustrates an example sequence of priority values of multiple control modes, in accordance with some embodiments.

FIGS. 16A-16D illustrates examples of scoring criteria, in accordance with some embodiments.

DETAILED DESCRIPTION

Figure 1A:
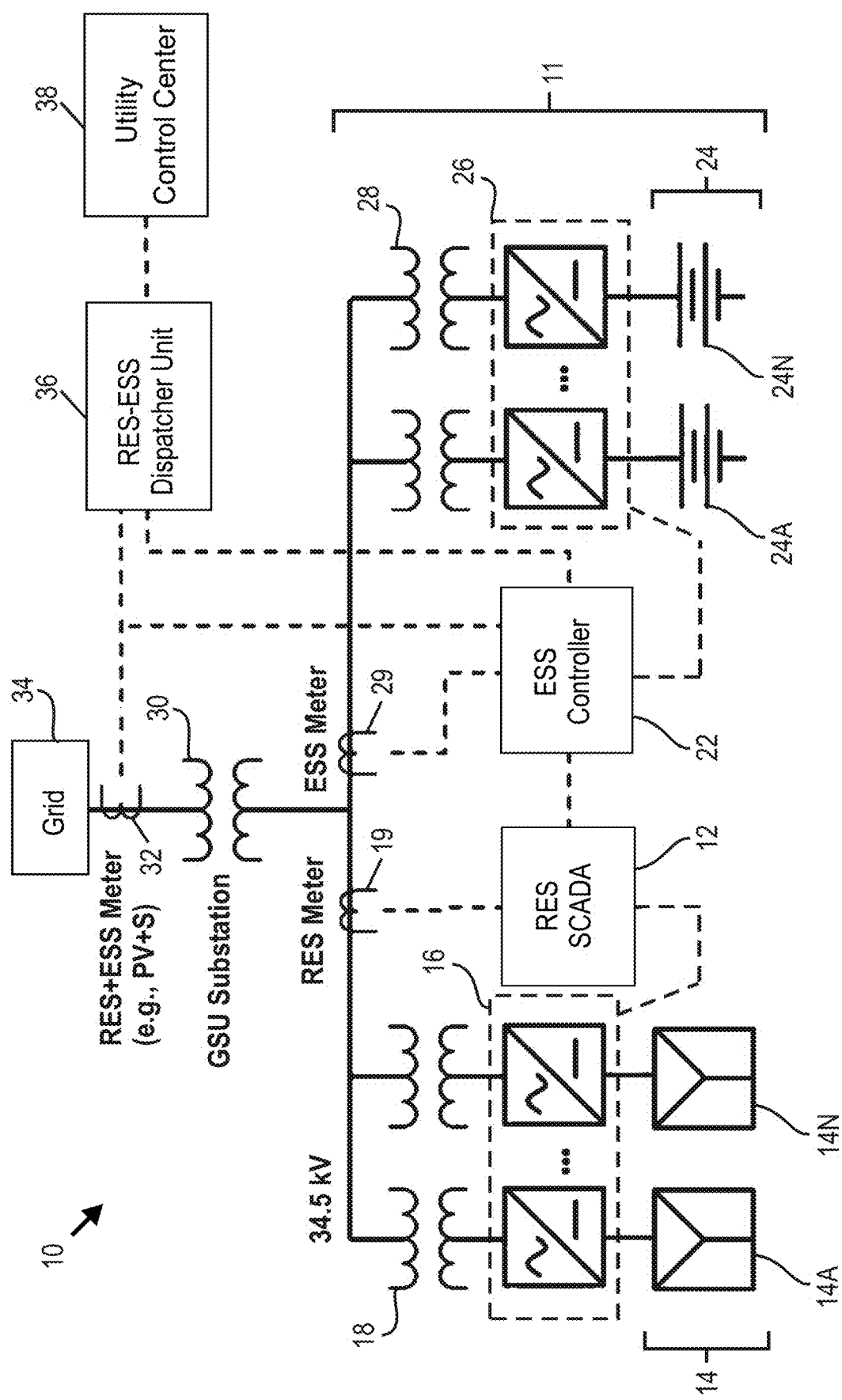
FIG. 1A is a schematic diagram showing interconnections between various components of an AC coupled metering and control system for controlling a renewable energy source and energy storage system (e.g., a PV array and a battery array chargeable with electric power produced by the PV array) according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein, but it should be understood that such concepts and applications are intended to fall within the scope of the disclosure and the accompanying claims.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The Modular Energy Storage Association (MESA) released a specification titled "DNP3 Application Note AN2018-001—DNP3 Profile for Communications with Distributed Energy Resources," wherein "DNP" refers to Distributed Network Protocol. The MESA specification defines some control modes for standalone energy storage systems. The present disclosure describes methods and systems for stacking the control modes to create effectively new synthetic control algorithms using a "stacking algorithm". Stacked control modes can be given a priority order, such that conflicts between control modes can be resolved.

The order of priority of control modes of a power plant can significantly alter the way the power plant behaves under various circumstances. A single priority order may not be best suited for operating a power plant control system under all possible circumstances.

For example, a power plant may be operated to assure reaching a predetermined SOC of the energy storage system by a predetermined time of day in order to enable it to provide power after dark for a predetermined duration of time. This first consideration may lead to the selection of a first control mode prioritization order. Alternatively, the power plant may be operated to deliver as much energy as possible as energy is generated by a renewable energy source. This second consideration may lead to the selection of a second control mode prioritization order. In another alternative, the power plant may be operated to deliver as much energy as possible only during late afternoon. This third consideration may lead to the selection of a third control mode prioritization order. The power plant controller, which is configured to consider different priority orders, could be given high-level instructions to best satisfy the first consideration, the second consideration, and/or the third consideration. The power plant controller may interpret the given high-level instructions as requiring one of the first control mode prioritization order, the second control mode prioritization order, or the third control mode prioritization order, at various times throughout the day. In some cases, a power plant controller is configured to revise a control mode priority order, such that the revision is automatically implemented by the plant controls when receiving the corresponding high-level instruction. In some cases, a power plant controller is configured to revise a control mode priority order, such that the revision is automatically implemented by the plant controls when receiving the corresponding high-level instruction. There may be any number of considerations, and that each consideration may comprise accounting for a variety of factors that may improve prioritization of control modes for the power plant.

Therefore, in some cases, it may be beneficial to employ a method for choosing an optimal control algorithm. Therefore, in some embodiments, a method for operating a power plant may comprise: (a) obtaining an energy production forecast for a forecast period, (b) generating a plurality of results associated with simulated operation of the power plant for the forecast period, wherein the plurality of simulation results are generated by executing a plurality of control algorithms in a virtual environment, (c) assigning a score to each simulation result and corresponding control algorithm, to thereby generate a plurality of scores for the plurality of simulation results and the plurality of control algorithms, (d) selecting an optimal control algorithm for the forecast period, based at least on the energy production forecast and a ranking of the plurality of scores, and (e) operating the power plant in accordance with the optimal control algorithm for a duration of the forecast period.

In some embodiments, a method for operating a power plant may comprise periodically selecting a control algorithm based on a simulation of the performance of a plurality of control algorithms, and then choosing the control algorithm that appears likely to best satisfy an optimization function. In some embodiments, the chosen control algorithm may operate for a certain duration of time before a subsequent selection of a control algorithm is made.

In some embodiments, a method for operating a power plant may comprise optimally selecting a control algorithm. In some embodiments, a plurality of simulations may be run, each simulation associated with a different control algorithm. In some embodiments, the plurality of simulations may account for forecasts. In some embodiments, an objective function may be calculated for each of the plurality of simulations, and the control algorithm that outputs the best value for the objective function may be selected by a user or a controller to be used for a period of time in operating a power plant. In some embodiments, a user may rerun the simulations and select a different control algorithm which may perform better while accounting for more up-to-date information.

In some embodiments, the plurality of control algorithms may comprise synthetic control algorithms. In some embodiments, the synthetic control algorithms may comprise one or more control modes. In some embodiments, the synthetic control algorithms may comprise stacked control modes. In some embodiments, the synthetic control algorithms may comprise stacked control modes having a priority order, as illustrated in FIG. 6 and FIGS. 7A-7E.

In some embodiments, a method of operating a power plant may comprise using a forecast. In some embodiments, the method of operating a power plant can comprise obtaining an energy production forecast for a forecast period. In some embodiments, a forecast may comprise a weather condition. In some embodiments, a forecast may comprise a climate condition. In some embodiments, a forecast may comprise a latitudinal location of the power plant. In some embodiments, a forecast may comprise a longitudinal location of the power plant. In some embodiments, a forecast may comprise a temperature. In some embodiments, a forecast may comprise an expected energy demand at a certain time period during the day. In some embodiments, a forecast may comprise a plurality of forecasts. Many alternative kinds of information about the world may be used with the disclosed systems or methods. In some embodiments, a forecast may be based on one or more variables associated with (i) one or more operating parameters of the power plant and/or (ii) energy market prices. In some embodiments, an energy production forecast may be based on one or more variables associated with (i) one or more operating parameters of the power plant and/or (ii) energy market prices.

In some embodiments, the method of operating a power plant can comprise accounting for operating parameters of system components, such as current limits, voltage limits, temperature limits, and the like. In some embodiments, the method of operating a power plant may comprise accounting for characteristics of an electrical energy storage device at the power plant, wherein the one or more characteristics comprise an energy storage type, efficiency level, or degradation behavior of the electrical energy storage device. In some embodiments, operating parameters may comprise parameters of an energy storage device (e.g., SOC, maximum effective energy capacity, temperature, pressure), parameters of a renewable energy storage device (e.g., number of active PV units, number of inactive PV units, or angle of a PV unit with respect to a light source). Many alternative information about the systems and methods may be used with the disclosed systems or methods.

In some embodiments, a virtual environment may be provided by any one of the computer or computing devices as disclosed herein.

In some embodiments, a score may be assigned based at least partially on a scoring criterion. FIG. 16A-FIG. 16D illustrate some examples of scoring criteria. FIG. 16A is a scoring criterion that is based on the power delivered to the point of interconnection (POI). FIG. 16B is a scoring criterion that is based on the BESS SOC at a certain time of day. FIG. 16C is a scoring criterion that is based on the BESS SOC at another time of day. FIG. 16D is a scoring criterion that is based on the power delivered to the POI that is a function of the time of day. In some embodiments, the objective value is a sum of the scoring criteria, for instance: Objective=$SC_1\{P_{CM}(t)\}+SC_2\{P_{CM}(t)\}+SC_3\{P_{CM}(t)\}+SC_4\{P_{CM}(t)\}$, where SC is the scoring criterion and $P_{CM}(t)$ is the priority value of the control modes as a function of time.

In some embodiments, a scoring criterion may be based on reaching a predetermined BESS SOC by a predetermined time of day. In some embodiments, a scoring criterion may be based on maintaining a predetermined BESS SOC during a predetermined time period in a day. In some embodiments, a scoring criterion may be based on delivering a maximum amount of energy in a day. In some embodiments, a scoring criterion may be based on delivery a maximum amount of energy during a predetermined time period in a day. In some embodiments, a scoring criterion may be based on storing a maximum amount of energy during a day. In some embodiments, a scoring criterion may be based on storing maximum amount of energy during a predetermined time period in a day. In some embodiments, a scoring criterion may be based on maximizing profit in a day. In some embodiments, a scoring criterion may be based on storing energy enough to provide for all energy demand requests in a predetermined time period in a day. The scoring criteria may be based on many variations, combinations, and alternatives to the criteria with the disclosed systems or methods.

In some embodiments, the optimal control algorithm may have the highest score based on the simulation results selected to be the optimal control algorithm. In some embodiments, the optimal control algorithm may have the lowest score based on the simulation results selected to be the optimal control algorithm. In some embodiments, the optimal control algorithm may have a score at or above a threshold score based on the simulation results selected to be the optimal control algorithm. In some embodiments, the optimal control algorithm may have a score at or below a threshold score based on the simulation results selected to be the optimal control algorithm.

Simulation results may be generated for any number of time points. In some embodiments, simulation results may be generated for a single time point. In some embodiments, simulation results may be generated for 2 time points, 3 time points, 4 time points, 5 time points, 10 time points, 100 time points, 1000 time points, 10,000 time points, 100,000 time points, or any other number of points.

In some embodiments, a simulation result may be generated at a single time point, and then later a second time point that is subsequent to the first time point. In some embodiments, a simulation result may be generated at a single time point, and then at the end of the forecast period for the single time point, a simulation result may be generated at a second time point. In some embodiments, a simulation result may be generated at any number of subsequent time points. In some embodiments, simulation results may be generated for any number of subsequent time points following the end of a forecast period.

In some embodiments, a simulation result may be generated at regular intervals when updated forecasts becomes available. In some embodiments, a simulation result may be generated at regular intervals when new data becomes available to enable the creation of a new forecast. In some embodiments, a simulation result may be generated approaching the start of a period of committed performance. For example, a committed performance may comprise a plant output that has been bid into the market, and the plant has received commitments for certain volumes of electricity at certain prices at certain subperiod(s) in a day. In some embodiments, a performance score may be computed incorporating both a production forecast and the commitments. In some embodiments, a simulation result may be generated at any time when the production objectives of the plant are updated. In some embodiments, the production objectives could be updated on a regular cycle or off-cycle (e.g., when a grid emergency arises). In some embodiments, a simulation result may be generated on a regular schedule determined by the availability of a computational power to conduct the simulation. In some embodiments, a simulation result may be generated on a regular schedule as new forecast(s) and/or performance data arises. In some embodiments, a simulation result may be generated on a regular schedule when the operating benefits of generating the simulation result vs. the operating costs of changing the control algorithms/rules of the system are in favor of generating the simulation result. In some embodiments, a simulation result may be generated on a regular schedule when an analysis showing the resulting optimal schedule for such updated simulations are provided to a user.

In some embodiments, a simulation result may be generated at a second time point in order to update the selection of the optimal control algorithm. In some embodiments, a simulation result may be generated at a second time point in order to operate the power plant in accordance with the selected optimal control algorithm. In some embodiments, a simulation result may be generated at a second time point in order to update the selection of the optimal control algorithm and then to operate the power plant in accordance with the selected optimal control algorithm. In some embodiments, the power plant is operated in accordance with a first selected optimal control algorithm after a first time point and before a second time point, without requiring additional energy production forecasting, generating of additional simulation results, or both.

In some embodiments, the first time point and the second time point may be spaced apart by an interval. In some embodiments, two adjacent time points may be spaced apart by an interval. In some embodiments, the interval ranges from at least about 1 hour to about 24 hours. In some embodiments, the interval ranges from at least about 1 day to about 3 days. In some embodiments, the interval may comprise at least about 1 μs, at least about 2 μs, at least about 3 μs, at least about 4 μs, at least about 5 μs, at least about 6 μs, at least about 7 μs, at least about 8 μs, at least about 9 μs, at least about 10 μs, at least about 20 μs, at least about 30 μs, at least about 40 μs, at least about 50 μs, at least about 60 μs, at least about 70 μs, at least about 80 μs, at least about 90 μs, at least about 100 μs, at least about 200 μs, at least about 300 μs, at least about 400 μs, at least about 500 μs, at least about 600 μs, at least about 700 μs, at least about 800 μs, at least about 900 μs, at least about 1 ms, at least about 2 ms, at least about 3 ms, at least about 4 ms, at least about 5 ms, at least about 6 ms, at least about 7 ms, at least about 8 ms, at least about 9 ms, at least about 10 ms, at least about 20 ms, at least about 30 ms, at least about 40 ms, at least about 50 ms, at least about 60 ms, at least about 70 ms, at least about 80 ms, at least about 90 ms, at least about 100 ms, at least about 200 ms, at least about 300 ms, at least about 400 ms, at least about 500 ms, at least about 600 ms, at least about 700 ms, at least about 800 ms, at least about 900 ms, at least about 1 s, at least about 2 s, at least about 3 s, at least about 4 s, at least about 5 s, at least about 6 s, at least about 7 s, at least about 8 s, at least about 9 s, at least about 10 s, at least about 20 s, at least about 30 s, at least about 40 s, at least about 50 s, at least about 1 min, at least about 2 mins, at least about 3 mins, at least about 4 mins, at least about 5 mins, at least about 6 mins, at least about 7 mins, at least about 8 mins, at least about 9 mins, at least about 10 mins, at least about 20 mins, at least about 30 mins, at least about 40 mins, at least about 50 mins, at least about 1 hr, at least about 2 hrs, at least about 3 hrs, at least about 4 hrs, at least about 5 hrs, at least about 6 hrs, at least about 7 hrs, at least about 8 hrs, at least about 9 hrs, at least about 10 hrs, at least about 11 hrs, at least about 12 hrs, at least about 13 hrs, at least about 14 hrs, at least about 15 hrs, at least about 16 hrs, at least about 17 hrs, at least about 18 hrs, at least about 19 hrs, at least about 20 hrs, at least about 21 hrs, at least about 22 hrs, at least about 23 hrs, at least about 1 day, at least about 2 days, at least about 3 days, at least about 4 days, at least about 5 days, at least about 6 days, or at least about a week.

In some embodiments, the method may comprise providing a GUI that permits, for instance, a user (i) to view the plurality of scores or (ii) to select one or more of the control algorithms as the optimal control algorithm for operating the power plant. In some embodiments, the method may further comprise receiving an input from the user via the GUI, wherein the input comprises a selection of the optimal control algorithm. In some embodiments, the method may comprise a user evaluating the outputs of the simulation results on the GUI to select the optimal control algorithm.

In some cases, the prioritization order may actively change automatically in response to signals communicated to the power plant or the controller. For example, the controller may have an initial control mode priority order when an updated weather forecast is received. In some cases, the controller may receive a signal for grid demand. In some cases, the controller may receive signal of an electrical outage in an area. In response to receiving these signals, the controller may update the control mode priority order with a new control mode priority order using the systems and methods described herein. A variety of signals may comprise information relevant to the considerations in the operation of a power plant, and that any one of those signals may be used to update the control mode priority order.

Figure 13:
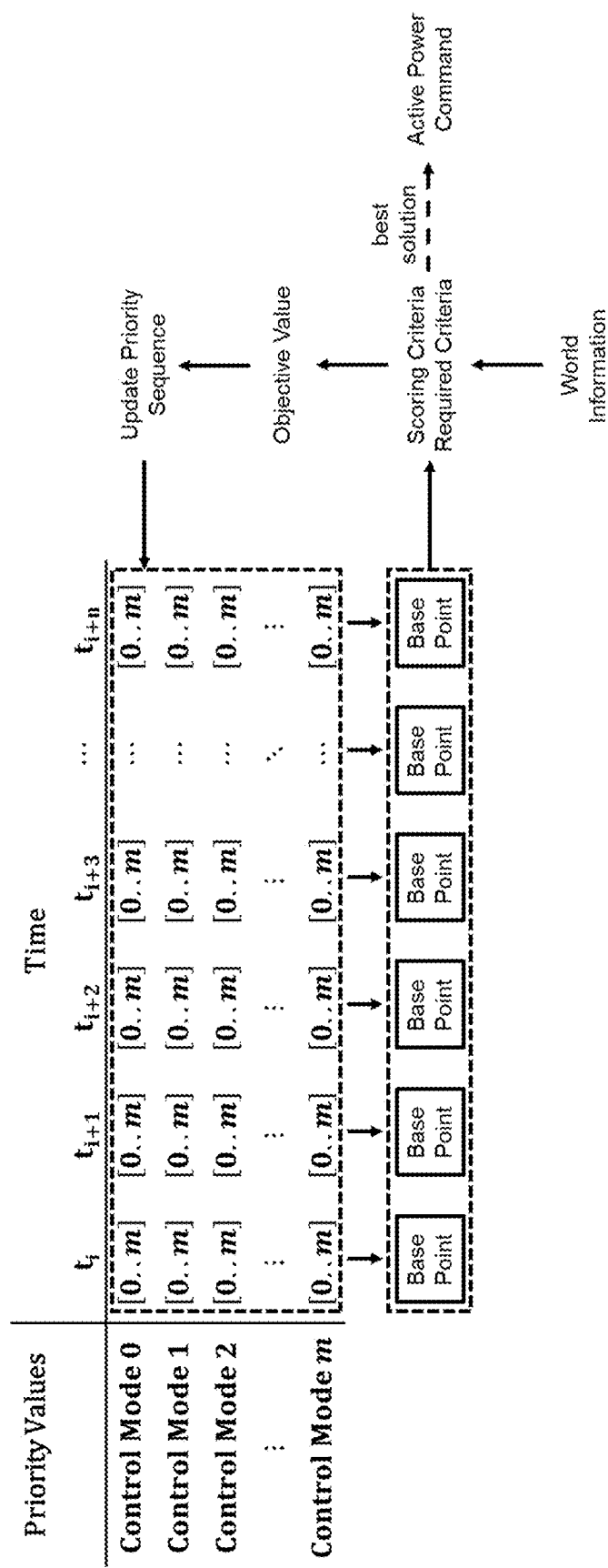
FIG. 13 illustrates an embodiment of the method for optimizing priority values of multiple control modes, in accordance with some embodiments.

FIG. 13 is a flow chart of a process for optimizing priority values of multiple control modes in order to provide an active power command that maximizes an objective function. In this embodiment, the method includes m number of control modes and n number of time steps for the active power command. Each control mode may take on an integer priority value ranging from 0 to m, and no two control modes may have the same priority value at the same time step.

In some embodiments, an optimization algorithm may randomly initialize the priority values of each control mode. Using this initial guess, a first sequence of basepoint values of the active power command may be calculated using any one of the methods described herein. Using the first sequence of basepoint values, a first objective value (or the objective function, or the target function) is calculated. The optimization algorithm then may return a new guess of the priority values of each control mode (i.e., a second set of priority values, which may also be referred to as "second priority order"), that leads to a second sequence of basepoint values of the active power command, and thus a second objective value. If the second objective value is improved in comparison to the first objective value, the second set of priority values and the second sequence of basepoint values are taken to be the best solution so far.

In some embodiments, the optimization algorithm may select new priority values at a single predetermined time step. In some embodiments, the optimization algorithm may select new priority values at every time step.

In some embodiments, the optimization algorithm may select new priority values at a plurality of predetermined time steps (i.e., not at every time step), such that between two adjacent predetermined time steps, the priority values would be equal to the priority values selected at the earlier predetermined time step of the two predetermined time steps.

The optimization algorithm may repeatedly return new set of priority values until some criterion (or criteria) is met. A criterion may be a convergence criterion (e.g., objective value has not improved more than by a specific number in the last n number of iterations), a time based criterion (e.g., the optimization algorithm is configured to return the best solution found in a predetermined amount of time), or a criterion based on the total number of guesses versus number of possible guesses (e.g., the optimization algorithm has examined every possible set of priority values). A criterion may be any one of various criterion that allows the optimization algorithm to stop returning new guesses when a satisfactory guess has been found. The optimization algorithm may iteratively return improved guesses of the priority values any number of times. In some embodiments, the optimization algorithm may consider information about the world (e.g., renewable energy generation forecasts, energy demand forecasts). In some embodiments, the optimization algorithm may consider information about the systems and methods described herein (e.g., the SOC of the BESS) and convey the information to a controller in the form of a set of signals. In some embodiments, the objective function may be based partially on a set of scoring criteria. The terms "guess," "estimate," or "prediction," as used herein, may be used interchangeably to mean a quantity that is output by an optimization algorithm. In some cases, a guess may comprise a scalar value, a logical value, or both. In some cases, a guess may comprise a single value or a plurality of values.

In some embodiments, the optimization algorithm may comprise a Monte Carlo algorithm, an evolutionary algorithm, a neural network, a genetic algorithm, or any combinations thereof. Many variations, combinations, and alternatives to the aforementioned algorithms may be used with the disclosed systems or methods.

Figure 14:
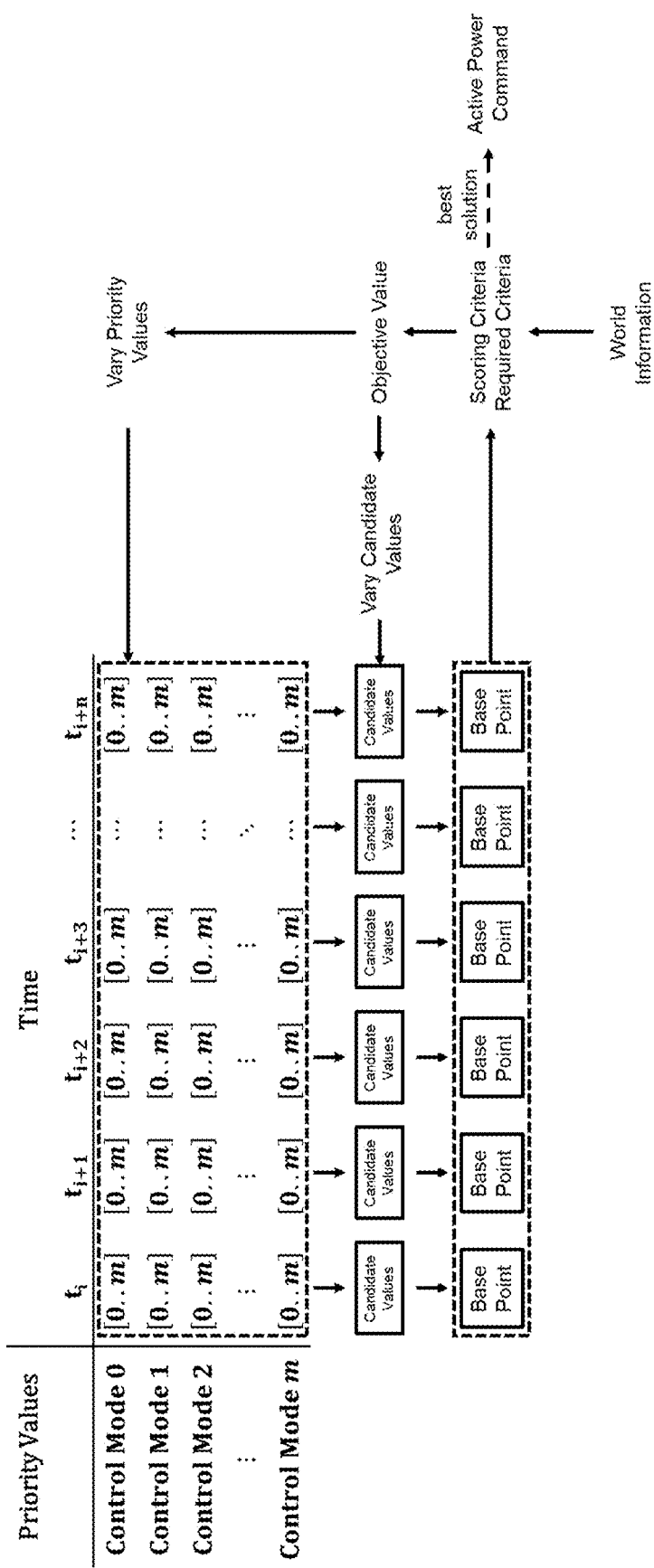
FIG. 14 illustrates an embodiment of the method for optimizing priority values of multiple control modes and optimizing basepoint values of multiple control modes, in accordance with some embodiments.

FIG. 14 is a flow chart of a process for optimizing priority values of multiple control modes in order to provide an active power command that maximizes an objective function. In this embodiment, the method includes m number of control modes and n number of time steps for the active power command. Each control mode may take on an integer priority value ranging from 0 to m, and no two control modes may have the same priority value at the same time step. In some embodiments, an optimization algorithm may randomly initialize the priority values of each control mode at every time step. Using this initial guess, a first sequence of basepoint values of the active power command is determined using any one of the methods described herein. Using the first sequence of basepoint values, the objective value (or the objective function, or the target function) is calculated. The optimization algorithm then may return an improved guess of the priority values of each control mode at every time step and an improved guess of the basepoint values of the active power command, that leads to a second sequence of basepoint values of the active power command. The optimization algorithm may iteratively return improved guesses of the priority values and basepoint values any number of times. In some embodiments, the optimization algorithm may consider information about the world (e.g., renewable energy generation forecasts, energy demand forecasts). In some embodiments, the optimization algorithm may consider information about the systems and methods described herein (e.g., the SOC of the BESS) and convey the information to a controller in the form of a set of signals. In some embodiments, the objective function may be based partially on a set of scoring criteria. The terms "guess," "estimate," or "prediction," as used herein, may be used interchangeably to mean a quantity that is output by an optimization algorithm. In some cases, a guess may comprise a scalar value, a logical value, or both. In some cases, a guess may comprise a single value or a plurality of values.

Some embodiments of the systems or the methods described herein may comprise one control mode, two control modes, three control modes, four control modes, five control modes, or more.

In some embodiments, a control mode may be a Staging mode, Charge-Discharge (CD) mode, CCD mode, Active Power Limit (APL) mode, Active Power Response (APR) mode, APS mode, Pricing Signal (PS) mode, Volt-Watt (VW) mode, FWC mode, and AGC mode.

Staging mode is a mode that prevents a controller from outputting a value charge/discharge signal that goes beyond some hardware limits, for instance, a current limit of an energy storage device. Staging mode sets lower limits, upper limits, or both on the range of candidate values that can be communicated to a device.

CD mode is a basepoint mode used to directly control the active power setpoint of the BESS. The active power target is set as a percentage of the nominal power capacity of the BESS. Additionally, a ramp rate control may be applied to the BESS power set-point.

In CCD mode, a BESS is given a schedule by which to reach a certain SOC by charging or discharging. For example, a BESS may be instructed to reach 100% SOC by 5 PM, and then reach 10% SOC by 10 PM. This schedule may be repeated every day. A BESS may be co-located and controlled in tandem with a PV electricity generator or any other renewable energy source.

APL mode is a mode that limits the charge or discharge rate to a specified absolute power level. The charge and discharge limits may be different.

APR mode is a mode that operates in any one of three different ways. It may operate to limit the load if it starts to exceed a target power level, to limit the power that needs to be imported from the grid, an operation referred to as Peak Power Limiting. It may operate to cause the output of the BESS to counteract any increase in generation above a target power level, an operation referred to as Generation Following. Or, it may operate to cause the output of the BESS to counteract any increase in load above a target power level, an operation referred to as Load Following.

APS mode is a basepoint control mode that smooths PV plus storage (PV+S) plant output based on a specified Electrical Connection Point (ECP) reference meter signal. In certain embodiments, APS may involve measuring current PV+S output at the POI with a grid, calculating a moving average of the ECP reference meter based on an APS filter time, calculating additional watts required based on (i) a deadband (extending ahead and behind of the moving average of reference power), (ii) a smoothing gradient, and (iii) the moving average of the ECP reference meter.

PS mode is a mode that uses a pricing signal to determine other actions. A pricing signal comprises information regarding the price of electricity bought or sold from one or more sources.

VW mode is a power control mode that reduces power output of a power plant in response to an increase in voltage at an inverter.

FWC mode is an additive power control mode used to alter a system's power output in response to measured deviation from a specified nominal frequency. In certain embodiments, FWC may involve measuring grid frequency using the reference EPC meter. If the grid frequency is within a specified deadband or if the current BESS SOC is outside allowed usable SOC limits, then no action is performed. However, if the grid frequency is outside a specified deadband, then additional power to be provided is calculated using a measured droop.

AGC mode is an additive power control mode that outputs a single PV+S power setpoint based on an active power target set by the master, wherein the AGC output is added on top of the basepoint value, subject to operating limit constraints of a RES-BESS (e.g., PV+S) facility.

The above examples of control modes are merely illustrative, and the systems and methods of the present disclosure can use any types of control modes.

FIG. 15 illustrates an example of sequences of priority values for multiple control modes. In some embodiments, each step in the sequence is at least about 30 minutes long. In some embodiments, the sequence is six steps long. In some embodiments, there are five control modes. In some embodiments, the priority of the staging mode is set to the highest priority value (zero is highest, larger the integer the lower the priority value).

In some embodiments, each step in the sequence is at least about 1 second long. In some embodiments, each step in the sequence is at least about 10 seconds long. In some embodiments, each step in the sequence is at least about 1 minute long. In some embodiments, each step in the sequence is at least about 10 minutes long. In some embodiments, each step in the sequence is at least about 30 minutes long. In some embodiments, each step in the sequence is at least about 1 hour long. Many different durations of time may comprise each step of the sequence of priority values with the disclosed systems or methods.

In some embodiments, the sequence is at least 1 step long. In some embodiments, the sequence is at least about 2 steps long. In some embodiments, the sequence is at least about 3 steps long. In some embodiments, the sequence is at least about 4 steps long. In some embodiments, the sequence is at least about 5 steps long. In some embodiments, the sequence is at least about 6 steps long. In some embodiments, the sequence is at least about 7 steps long. In some embodiments, the sequence is at least about 8 steps long. In some embodiments, the sequence is at least about 9 steps long. In some embodiments, the sequence is at least about 10 steps long. In some embodiments, the sequence is at least about 20 steps long. In some embodiments, the sequence is at least about 30 steps long. In some embodiments, the sequence is at least about 40 steps long. In some embodiments, the sequence is at least about 50 steps long. In some embodiments, the sequence is at least about 60 steps long. In some embodiments, the sequence is at least about 70 steps long. In some embodiments, the sequence is at least about 80 steps long. In some embodiments, the sequence is at least about 90 steps long. In some embodiments, the sequence is at least about 100 steps long. In some embodiments, the sequence is at least about 200 steps long. In some embodiments, the sequence is at least about 300 steps long. In some embodiments, the sequence is at least about 400 steps long. In some embodiments, the sequence is at least about 500 steps long. In some embodiments, the sequence is at least about 600 steps long. In some embodiments, the sequence is at least about 700 steps long. In some embodiments, the sequence is at least about 800 steps long. In some embodiments, the sequence is at least about 900 steps long. In some embodiments, the sequence is at least about 1000 steps long. The term "about," as used herein, may mean plus or minus 1 step, plus or minus 10 steps, plus or minus 100 steps, or plus or minus 1000 steps. Any number of steps may comprise sequence of priority values with the disclosed systems or methods.

In some embodiments, a renewable energy source may comprise a solar energy source, a wind energy source, a geothermal energy source, a biomass renewable energy source, a hydroelectric energy source, or any combination thereof. The various types of renewable energy sources may each comprise different round-trip efficiencies or degradation characteristics.

In some embodiments, a renewable energy production forecast may comprise a forecast for a solar energy source, a wind energy source, a geothermal energy source, a biomass renewable energy source, a hydroelectric energy source, or any combination thereof.

In certain embodiments, a time-dependent forecast of electrical energy production may be used in the creation or the optimization of a stack of control modes. In some embodiments, a time-dependent forecast may be based on on-site sky imaging (e.g., using a camera), satellite imaging, or meteorological modeling. In certain embodiments, a time-dependent forecast of electrical energy production may be based on an ensemble of two or more (or all three) of on-site sky imaging (e.g., using a camera), satellite imaging, and meteorological modeling.

In certain embodiments, a forecast may comprise various durations of a forecast period. In certain embodiments, a forecast period may comprise a duration of at least about 1 min, at least about 5 min, at least about 10 mins, at least about 15 mins, at least about 30 mins, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, at least about 15 hours, at least about 16 hours, at least about 17 hours, at least about 18 hours, at least about 19 hours, at least about 20 hours, at least about 21 hours, at least about 22 hours, at least about 23 hours, at least about 1 day, at least about 2 days, at least about 3 days, at least about 4 days, at least about 5 days, at least about 6 days, at least about 7 days, at least about 1 month, at least about 3 months, or at least about 1 year.

FIG. 1A is a schematic diagram showing interconnections between various components of an AC coupled metering and control system 10 for controlling a renewable electrical energy generation device 14 including multiple generation units 14A-14N (such as a PV array including PV units) and an energy storage device 24 including multiple energy storage units 24A-24N (such as a battery array including battery units) chargeable with electric power produced by the renewable electrical energy generation device 14 in a RES-BESS facility 11 according to one embodiment. The RES-BESS facility 11 may combine a renewable electrical energy generation device 14 (e.g., such as an array of PV units, wind turbines, or the like), and an energy storage device 24 (e.g., an array of lithium-based batteries) that may be coupled to a single substation 30 and/or located in a single property, area, or structure.

FIG. 1A illustrates an AC-coupled RES-BESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34), but in certain embodiments, the RES-BESS facility 11 may embody a DC coupled RES-BESS facility. In certain embodiments, an energy storage device 24 may include at least one of (or a combination of) batteries 24A, 24B using various constructions and chemistries, capacitors, or mechanical energy storage devices such as flywheels or pumped-hydro installations. In certain embodiments, an energy storage device 24 may include at least one hydrolysis unit (e.g., configured to electrolyze water to release hydrogen) and a hydrogen storage unit (e.g., adsorbent media for releasably binding hydrogen, storage vessels, and/or reversible chemical reactant vessels or beds). In certain embodiments, an energy storage device 24 may consist of electrical charge storage devices such as batteries, optionally augmented with capacitors.

In certain embodiments, a RES-BESS dispatcher unit 36 has the ability to control the charge or discharge of the energy storage device 24 (e.g., batteries) by communicating with a BESS controller 22, which may be located in the RES-BESS facility 11. A RES SCADA (supervisory control and data acquisition) controller 12 is operatively coupled with RES inverters 16 associated with the renewable electrical energy generation device 14 (optionally embodied in a PV array), and the BESS controller 22 is operatively coupled with BESS inverters 26 associated with the energy storage device 24, with both the RES SCADA controller 12 and the BESS controller 22 being in communication with the RES-BESS dispatcher unit 36. In certain embodiments, a utility control center 38 (e.g., of an electric power utility or grid operator) may communicate with the RES-BESS dispatcher unit 36 using DNP3 and set different configuration options. Additionally, the RES-BESS dispatcher unit 36 receives (or generates) an accurate renewable generation forecast (e.g., solar generation forecast) that it uses to implement the control modes. As shown in FIG. 1A, certain embodiments may utilize readily available electric power meters, such as a RES+BESS electrical power meter 32 to measure RES-BESS (e.g., PV+S) facility output, a RES electrical power meter 19 to measure RES output, and a BESS electrical power meter 29 to measure BESS output. Signals from the RES electrical power meter 19 are provided to the RES SCADA controller 12, and signals from the BESS electrical power meter 29 are provided to the BESS controller 22. The electric power generated by the RES-BESS facility 11 may be provided to an electric power system (e.g., an AC electrical grid 34) via a generator step-up (GSU) substation 30 that implements protection and appropriate voltage conversion. RES transformers 18 and BESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
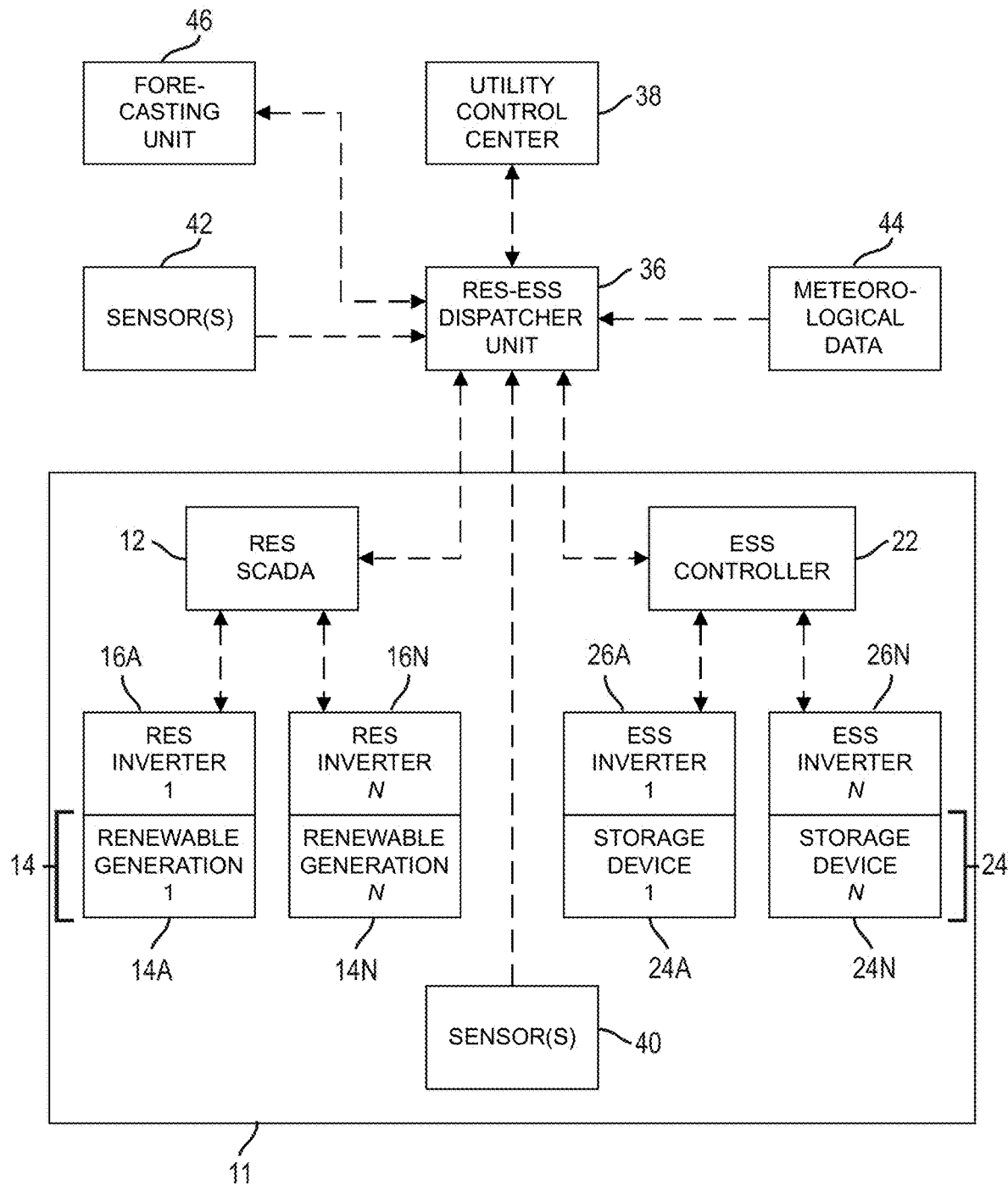
FIG. 1B is a schematic diagram showing certain components of the AC coupled metering and control system of FIG. 1A, in accordance with some embodiments.

FIG. 1B is a schematic diagram showing certain components of the AC coupled metering and control system of FIG. 1A, including interconnection of control- and sensor-related components. As shown in FIG. 1B, the RES-BESS dispatcher unit 36 is arranged between a utility control center 38 and a RES-BESS facility 11. Within the RES-BESS facility 11, a RES SCADA controller 12 is operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-BESS facility 11, a BESS controller 22 is operatively coupled with BESS inverters 26A-26N that are configured to provide AC conversion of DC power supplied by energy storage units 24A-24N (e.g., arrangeable as parts of an energy storage device 24). The RES-BESS facility 11 further includes at least one sensor 40, which may comprise one or more sky imaging sensors useful to determine sky conditions (such as presence of clouds) proximate to the RES-BESS facility 11, with output signals from the at least one sensor 40 being supplied to the RES-BESS dispatcher unit 36. The RES-BESS dispatcher unit 36 may also receive: (i) signals from one or more sensors 42 (e.g., satellite imaging sensors or the like) not necessarily associated with the RES-BESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-BESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
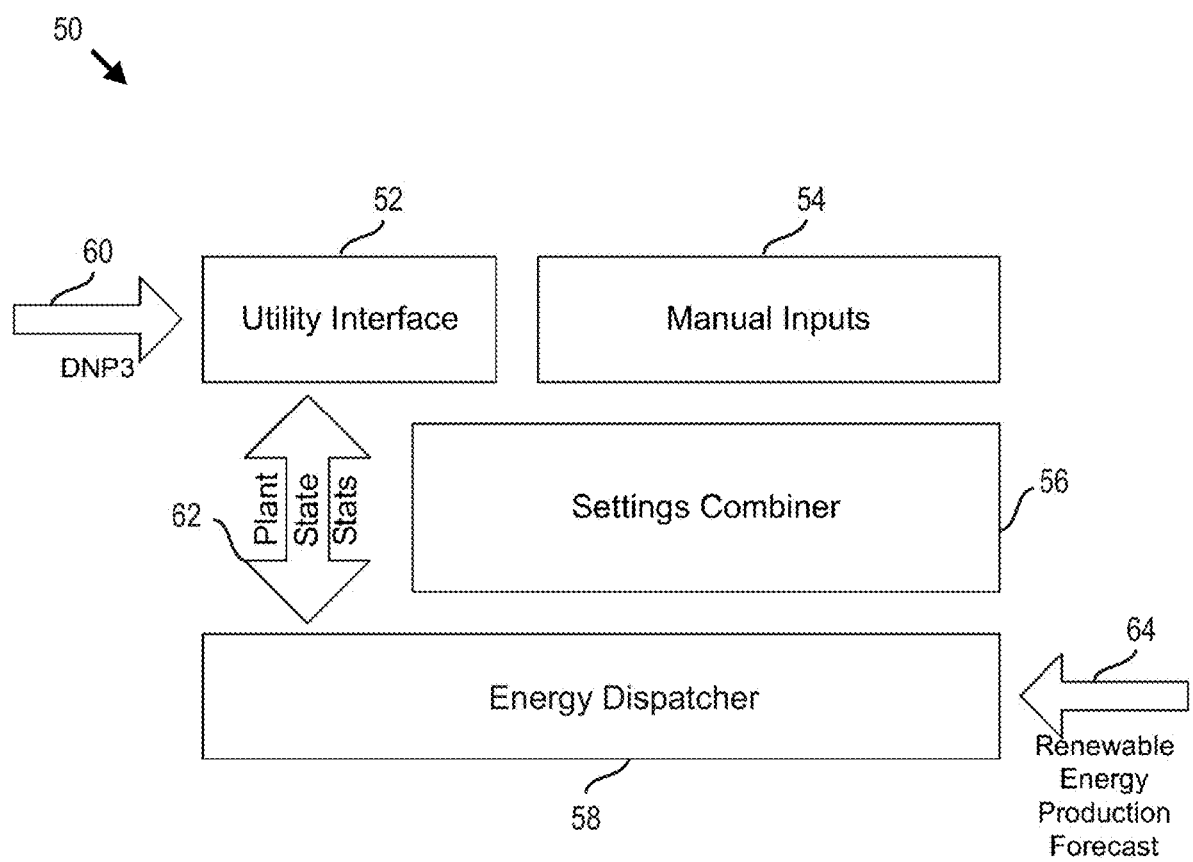
FIG. 2 is a block diagram for a processor-based energy dispatch control system for dispatching a renewable electrical energy generation resource and an electrical energy storage device chargeable with electric power produced by the renewable electrical energy generation resource according to one embodiment, in accordance with some embodiments.

FIG. 2 is a block diagram showing for a processor-based energy dispatch control system 50 for dispatching a RES-BESS facility (e.g., including renewable electrical energy generation resource and an electrical energy storage device chargeable with electric power produced by the renewable electrical energy generation resource) according to one embodiment. The control system 50 includes as functional blocks a utility interface 52, manual inputs 54, a settings combiner 56, and an energy dispatcher 58. The utility interface 52 communicates with an electric power system utility, and with the energy dispatcher 58 to receive configuration commands and send plant status and state information 62. An example of a CCD mode configuration set by a utility may be a schedule that contains a first SOC target at a pre-determined time, and a second SOC target at a second pre-determined time. For example, the utility may want the BESS to reach an SOC of 90% by 5:00 PM and an SOC of 10% by 10:00 PM. The utility interface 52 receives DNP3 (Distributed Network Protocol) information via a DNP3 link 60, and is responsible for converting the published DNP3 configuration points to internal data structures. The utility interface 52 is also responsible for communicating any data structure changes back to the utility via the DNP3 link 60. Manual inputs 54 include configuration parameters that are not addressable by MESA-ESS SCADA points. The settings combiner 56 validates any configuration inputs and passes them to the energy dispatcher 58 in one implementation. The settings combiner 56 receives MESA-ESS schedules/modes/curves provided by a utility or grid operator, receives schedules produced by an optimizer, and receives any potential manual inputs 54, and then produces combined schedules/modes/curves. The energy dispatcher 58 is an engine that executes control modes (including but not limited to coordinated charge/discharge or CCD) for the RES-BESS facility (or plant) and decides on the charge or discharge level of the BESS utilizing a renewable energy production forecast 64. The energy dispatcher 58 is responsible for controlling output of a RES-BESS in short time scales by observing the current state of the RES-BESS plant, utilizing time-dependent forecasts of electrical energy production by the RES, and utilizing any combined MESA-ESS schedules/modes/curves produced by the settings combiner 56. A renewable energy forecast may contain a time series of points for the power expected to be generated by the renewable energy source (e.g., PV array, wind turbine, etc.). Such a forecast may have a format of (timestamp, power value) and contain a set of time values of specified intervals (e.g., 15 minutes in 1 minute intervals, 36 hours in 1-hour intervals, etc.). These potential formats and timeframes are provided to illustrate the nature of an exemplary forecast, and are not intended to limit the disclosure. The energy dispatcher 58 is also responsible for passing alerts and RES-BESS plant state and/or status information back to the utility interface 52.

In some embodiments, methods disclosed herein for controlling a RES-BESS plant may work simultaneously with other (e.g., PV+S) control algorithms according to an amalgamation process. Such an amalgamation process uses ideal, minimum (lower bound), and maximum (upper bound) values produced by each control algorithm (wherein each algorithm corresponds to a different control mode), and based on the configured priority of a control algorithm, amalgamation produces a final BESS charge or discharge target. In this regard, in certain embodiments a time-varying charge/discharge control signal is susceptible to being varied by adoption of one or more control modes of multiple control modes, wherein for each control mode of a plurality of control modes, signal candidate values including an upper bound value, a lower bound value, and an ideal value are generated. Additionally, an intersection of control signal candidate values among multiple control modes is identified, or an ideal value for a control mode of highest priority is selected, to generate the time-varying charge/discharge control signal. Examples of control modes that may be utilized in methods disclosed herein include the following active power modes specified in the MESA-ESS specification: CD mode, CCD mode, APL mode, APR mode, APS mode, PS mode, VW mode, FWC mode, and AGC mode.

Figure 3:
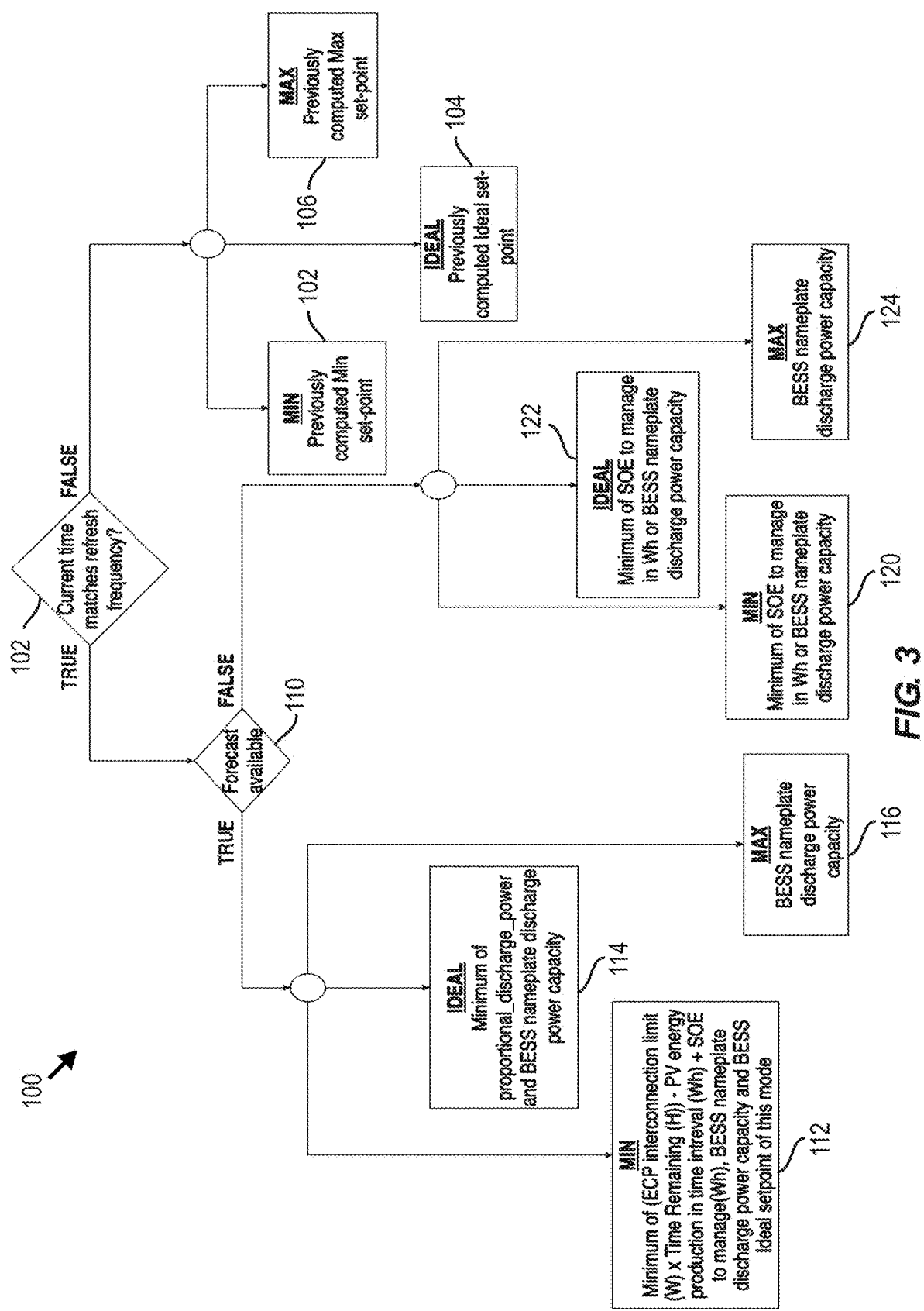
FIG. 3 is a logic diagram for charging an electrical energy storage device to reach a SOC target value using a system that includes a PV array and a battery array chargeable with electric power produced by the PV array according to one embodiment, in accordance with some embodiments.
Figure 4:
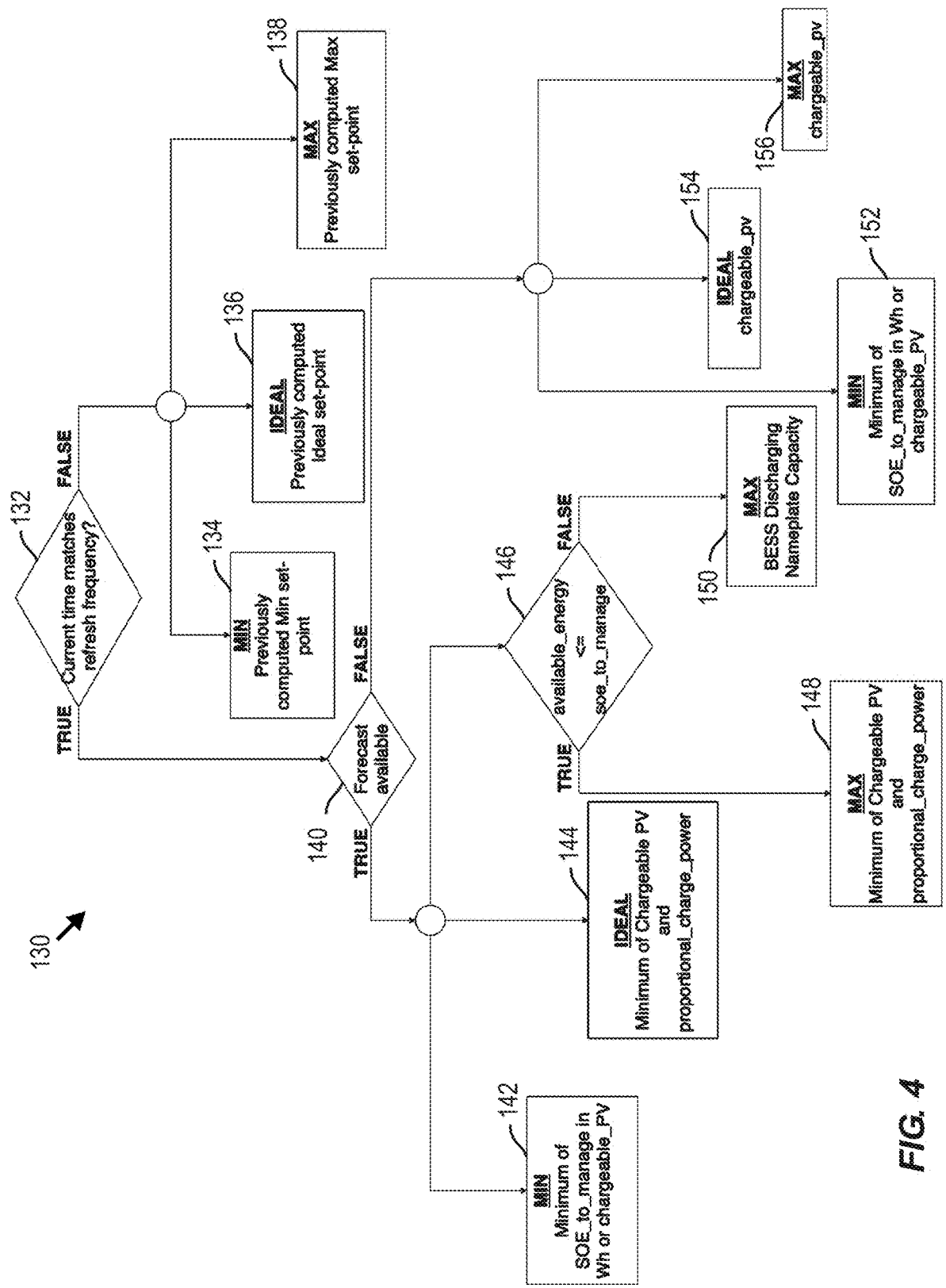
FIG. 4 is a logic diagram for discharging an electrical energy storage device using a system that includes a PV array and a battery array chargeable with electric power produced by the PV array according to one embodiment, in accordance with some embodiments.

Referring now to FIGS. 3 and 4, FIGS. 3 and 4 embody logic diagrams for charging and discharging, respectively, of an electrical energy storage device using a system that includes a PV array and a battery array chargeable with electric power produced by the PV array according to a CCD mode. Although PV is referenced herein, it is to be appreciated that the disclosed concepts extend to any one or more types of renewable electrical energy generating units (wind, solar, tidal, etc.) FIGS. 3 and 4 refer to numerous variables. Before describing FIGS. 3 and 4 in detail, variables described in such figures are described in the following Table 1.

by a certain time. CCD mode may be executed in a loop inside the energy dispatcher and at each refresh period calculates and returns to the controller the following three values: BESS_ideal, BESS_max, and BESS_min, as will be described hereinafter, following discussion of refresh period.

A refresh period is considered before execution of CCD mode, to limit the ability of RES-BESS facility output to fluctuate except during specified time intervals. From a dispatching perspective, limiting the RES-BESS output fluctuations to specified time intervals is attractive to permit an electrical system (e.g., grid) operator to coordinate different generation resources to meet a specified system load, since various generation purchase and supply transactions are commonly scheduled as firm power outputs for specific (predetermined) blocks of time. Participation by bidding in energy markets or energy balance markets requires firm commitments to supply power for specified periods of time. To address this issue, a refresh period may be used with systems and method disclosed herein, with the refresh period being selected to be a time period convenient for a system operator (e.g., 15 minutes, 30 minutes, or another selectable time interval). A refresh period corresponds to a time between two consecutive executions of a RES-BESS control algorithm (e.g., for establishment of new basepoint values). BESS_min, BESS_ideal, and BESS_max values are

TABLE 1

| Variable | Definition |
| --- | --- |
| refresh period | The time between two consecutive executions of the algorithm, wherein BESS_ideal, BESS_min and BESS_max values are held constant during a refresh period (until a next execution of the algorithm) |
| SOC | State of charge |
| SOE | State of energy |
| soc_to_manage | The difference between the target SOC (%) and the current SOC (%) |
| soe_to_manage | SOE (%) applied to the battery energy rating in Watt-hours |
| pv_production_forecast | An array-like object consisting of the PV power production forecast from the current timestep to the SOC target time |
| pv_production_in_period | Forecasted PV production during the refresh period |
| chargeable_pv_forecast | Lesser of the current PV production and the BESS name plate charging capacity |
| chargeable_energy_till_target | Sum of chargeable_pv over the pv production forecast |
| avg_pv_production_forecast | Arithmetic mean of pv_production_forecast |
| avg_pv_production_in_period | Arithmetic mean of pv_production_in_period |
| avg_charge_power | Amount of energy required to be supplied to a battery to reach a target SOC value divided by the number of hours remaining |
| avg_discharge_power | Amount of energy required to be received from a battery to reach a target SOC value divided by the number of hours remaining |
| proportional_charge_power | Average charge power multiplied by avg_pv_production_in_period and then divided by the avg_pv_production_forecast |
| proportional_discharge_power | Average discharge power multiplied by the minimum of (i) avg pv production in period divided by the avg_pv_production_forecast and (ii) 1 (i.e., the discharge is capped at a multiplier of 1) |
| disch_energy_avail_till_target | (ECP interconnection limit (W) × time remaining (H)) − PV energy production in time interval (Wh) |

Charging Logic. FIG. 3 is a diagram providing charging logic 100 for charging an electrical energy storage device to reach a SOC target value using a system that includes a PV array and a battery array chargeable with electric power produced by the PV array, according to one embodiment. CCD mode runs from a configured start time to a configured end time and works to get the BESS to a desired SOC target recalculated once upon the expiration of a refresh period, but after such values are recalculated, they remain constant until expiration of the next refresh period. This is shown in FIG. 3. Decision block 102 considers whether the current time matches the refresh frequency. If the query in decision block 102 is false (i.e., the current refresh period has not yet ended), then values for each of BESS_min, BESS_ideal, and BESS_max remain unchanged (i.e., BESS_min remains the previously computed Min set-point at block 102, BESS_ideal remains the previously computed Ideal set-point at block 104, and BESS_max remains the previously computed Max set-point at block 106). If the query in decision block 102 is true (i.e., the current refresh period has ended), then values for each of BESS_min, BESS_ideal, and BESS-max may be recalculated, starting at decision block 110.

BESS_Ideal Calculation. Decision block 110 considers whether a forecast is available. If a forecast is available (i.e., the inquiry at decision block 110 is true), then the BESS prioritizes charging at times when the PV generation is higher, and BESS_min, BESS_ideal, and BESS_max are computed at blocks 112, 114, and 116, respectively. At block 114, BESS_ideal is set to the minimum of proportional_charge_power and BESS nameplate discharge power capacity. In implementations wherein grid charging is not permitted, the highest charging level that can be obtained is equal to the power generated from PV. If a forecast is not available (i.e., the inquiry at decision block 110 is false), then in certain embodiments the BESS performs "greedy charging" by charging the entire chargeable_pv at every timestep. In certain embodiments, if a forecast is not available, the BESS_ideal set-point is the minimum of SOE to manage in Wh or BESS nameplate discharge power capacity, as indicated at block 122.

BESS_Max Calculation. In certain embodiments, the BESS_max power set-point for CCD is the same as the BESS_ideal power set-point if the amount of energy available is less than the amount of energy required to reach the SOC target. In certain embodiments, the BESS_max power set-point is the nameplate discharge power capacity of the BESS, as indicated at block 116. If a forecast is not available (i.e., the inquiry at decision block 110 is false), then the BESS_max power set-point is the BESS nameplate discharge power capacity, as indicated at block 124.

BESS_Min Calculation. If a forecast is available (i.e., the inquiry at decision block 110 is true), then the BESS_min power set-point for charging (most negative power set-point) is the minimum of (i) (ECP interconnection limit (in Watts) times time remaining (in Hours)) minus PV energy production in time interval (in Watt hours) plus SOE to manage (in Watt hours), (ii) BESS nameplate discharge power, or (iii) BESS_ideal setpoint of this mode, as indicated at block 112. If a forecast is not available (i.e., the inquiry at decision block 110 is false), then the BESS_min power set-point is the minimum of SOE to manage in Wh or BESS nameplate discharge power capacity, as indicated at block 120.

Discharging Logic. FIG. 4 is a diagram providing discharging logic 130 for discharging an electrical energy storage device using a system that includes a PV array and a battery array chargeable with electric power produced by the PV array according to one embodiment. As before, a refresh period is considered before execution of CCD mode, to limit the ability of RES-BESS facility output to fluctuate except during specified time intervals. As shown in FIG. 4, decision block 132 considers whether the current time matches the refresh frequency. If the query in decision block 132 is false (i.e., the current refresh period has not yet ended), then values for each of BESS_min, BESS_ideal, and BESS_max remain unchanged (i.e., BESS_min remains the previously computed Min set-point at block 134, BESS_ideal remains the previously computed Ideal set-point at block 136, and BESS_max remains the previously computed Max set-point at block 138). If the query in decision block 132 is true (i.e., the current refresh period has ended), then values for each of BESS_min, BESS_ideal, and BESS_max may be recalculated, starting at decision block 140.

With continued reference to FIG. 4, CCD mode runs from a configured start time to a configured end time and works to get the BESS to a desired SOC target by a certain time. CCD mode may be executed in a loop inside the energy dispatcher and at each refresh period calculates and returns to the controller the following three values: BESS_Ideal, BESS_Max, and BESS_Min, as will be described below.

BESS_ideal Calculation. Decision block 140 considers whether a forecast is available. If a forecast is available (i.e., the inquiry at decision block 140 is true), then the BESS prioritizes discharging at times when the PV generation is lower, and BESS_min, BESS_ideal, and BESS_max are computed at blocks 142, 144, and 146, respectively. At block 144, BESS_ideal is set to the minimum of chargeable PV and proportional_charge_power. If the discharging period is not during the day, then the BESS_ideal power setpoint would be the avg_discharge_power. If a forecast is not available (i.e., the inquiry at decision block 140 is false), the Ideal BESS discharge power setpoint would be chargeable_pv, as indicated at block 154.

BESS_min Calculation. Regardless of whether a forecast is available (i.e., if the inquiry at decision block 140 is true or false), the Min BESS power setpoint would be the minimum of (i) SOE_to_Manage (in Watt-hours) or chargeable_PV, as indicated at blocks 142 and 152.

BESS_max Calculation. If a forecast is available (i.e., the inquiry at decision block 140 is true), then logic proceeds to decision block 146, which presents an inquiry whether available_energy is less than or equal to SOE_to_manage. If the inquiry at decision block 146 is true, then the BESS_max power setpoint would be the minimum of chargeable PV and proportional_charge_power, as indicated at block 148. If the inquiry at decision block 146 is false, then the BESS_max power setpoint would be the BESS discharging power nameplate capacity, as indicated at block 150. Turning back to decision block 140, if the inquiry at decision block 140 is false, then the BESS_max power setpoint would be chargeable_pv, as indicated at block 156.

Figure 5:
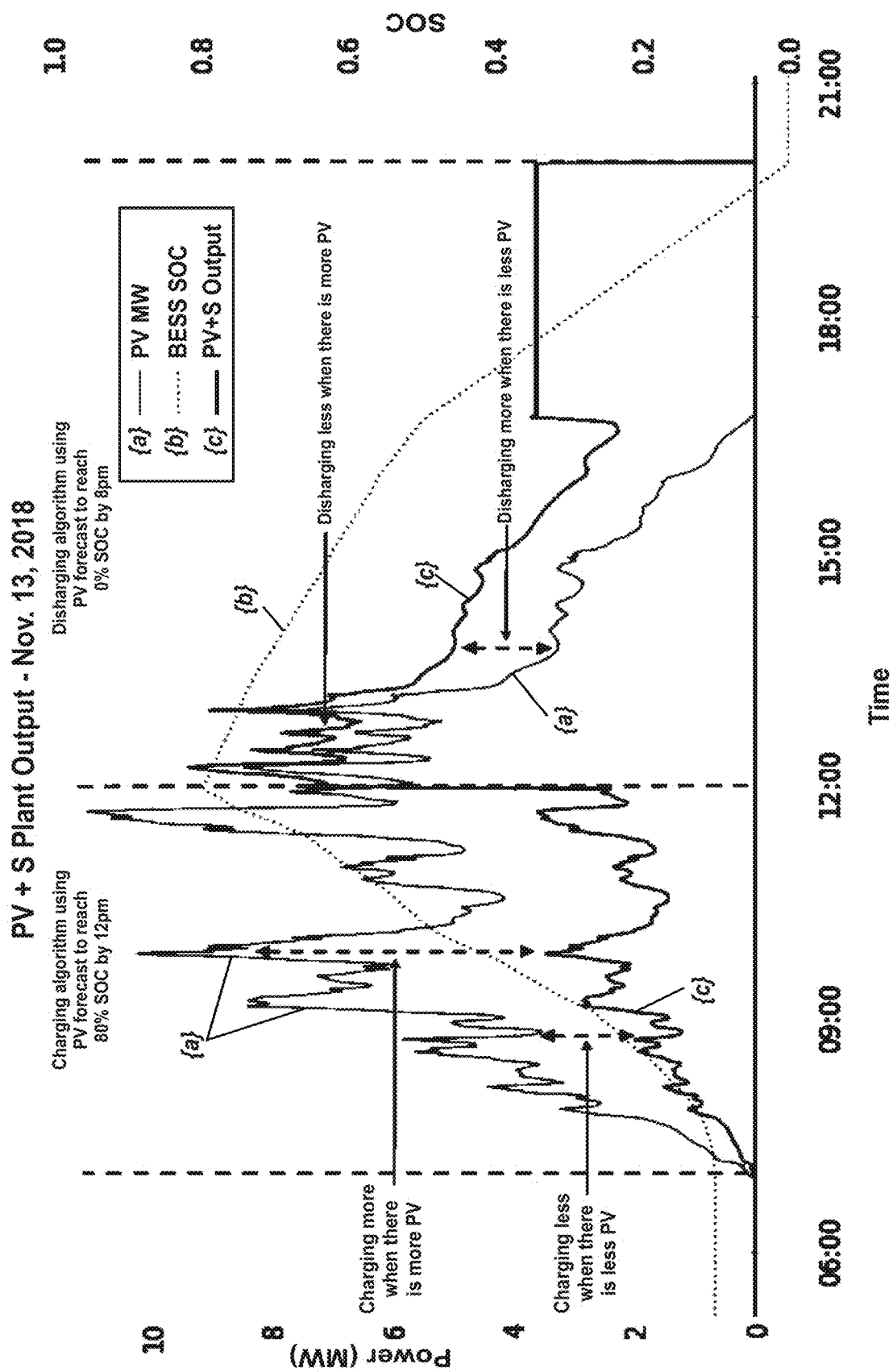
FIG. 5 is a modeled output plot for a system including a renewable electrical energy generation resource (RES) and a BESS chargeable with electric power produced by the renewable electrical energy generation resource, when controlled by a method as disclosed herein, for a period between 06:00 and 21:00 of a single day, in accordance with some embodiments.

FIG. 5 is an exemplary output plot for system including a RES) and an electrical energy storage device (e.g., a BESS) chargeable with electric power produced by the renewable electrical energy generation resource, when controlled by a method as disclosed herein, for a period between 06:00 and 21:00 of a single day. The output plot includes PV generation in megawatts (PV MW), SOC of the BESS (BESS SOC), and aggregated PV plus storage energy supplied to an electric grid (PV+S Output). A SOC schedule requires attainment of 80% SOC for the BESS by 12:00, and 0% SOC by 20:00 (8:00 PM). A charging algorithm is employed from about 07:00 to 12:00, and a discharging algorithm is employed from 12:00 to 20:00. While the charging algorithm is employed, PV MW is not necessarily the PV+S Output, since a portion of the PV generation is allocated to charge the BESS. The SOC of the BESS rises from 07:00 to 12:00, but not at a linear rate. As shown by the dashed vertical lines with arrow ends, while the charging algorithm is in use, a greater amount of BESS charging results when more PV generation is available, and a lesser amount of BESS charging results when less PV generation is available. Conversely, while the discharging algorithm is in use, a lesser amount of energy is discharged from the BESS when more PV generation is available, and a greater amount of energy is discharged from the BESS when less PV generation is available. It should be noted that FIGS. 3-5 and their corresponding description depict and describe the functioning of an electric power plant operating according to a CCD mode. Any of the control modes of the MESA-ESS and any other control modes that are not listed in the MESA-ESS may be stacked and scored according to a forecasting and/or scoring model using the systems and methods described herein to control an electric power plant.

As noted previously herein, the MESA-ESS specification describes the following active power modes: [1] CD mode, [2] CCD mode, [3] APL mode, [4] APR mode, [5] APS mode, [6] PS mode, [7] VW mode, [8] FWC mode, and [9] AGC mode. Modes [1] to [6] result in a battery active power output that may be called a "basepoint," such that modes [1] to [6] may be termed basepoint modes. Modes [7] to [9] are "additive" modes that add positive or negative power to the basepoint, and may be termed non-basepoint modes. A unique characteristic of the non-basepoint modes is that APS mode will not consider the resultant added power from them when calculating the next basepoint.

The MESA-ESS specification delineates how different active power control modes should function and identifies the possibility of combining them, but such document does not attempt to define how the functionality of different control modes can be combined or stacked. Each active mode can usually be satisfied with a range of power responses at any given time. For example, if a 4-hour battery (e.g., that is chargeable from 0% to 100% in 4 hours) has an 8 hour window in which the battery is to be charged, the battery could charge all in the beginning, all at the end, or evenly throughout the 8 hour window. This flexibility can be leveraged to implement multiple modes at the same time, such as a charge window and smoothing solar power generation. Amalgamation processes described herein enable different MESA-ESS active power control modes to be combined to produce an output that accommodates the respective control modes if they are compatible, while also allowing each control mode to be prioritized relative to the other control mode.

As introduced previously herein, an algorithm dedicated to each active power control mode (e.g., a control algorithm) may output an ideal value, a minimum (lower bound—corresponding to the most negative or least positive) value, and a maximum (upper bound—corresponding to the most positive or least negative) value that can be accommodated by a BESS while the still being able to satisfy defined requirements (e.g., according to a SOC schedule). In certain embodiments, such values embody power setpoints that may be defined with respect to a BESS meter, whereby a negative value represents charging and a positive value represents discharging. The ideal BESS power setpoint for each mode represents the preferred active power requirement for it to operate most efficiently to perform its function. The three setpoints (ideal, minimum, and maximum) could mean different things for different active power control modes. For example, for CCD mode, the BESS_min and BESS_max power setpoints would represent the minimum and maximum BESS power, respectively, that the mode can accommodate at that instant while satisfaction of a SOC target is still attained. The ideal power setpoint could be defined as the required BESS active power to reach the SOC target in an optimal fashion.

For APL control mode that limits the power below a certain active power limit, the Max BESS power setpoint would be the maximum power the control mode can accommodate (i.e., a power threshold), while the BESS_min power setpoint for this case could be the minimum operating limit of the RES-BESS plant since the control mode does not have a set lower limit threshold.

Mode-stacking may be performed by connecting different control modes in series. This may be implemented by passing the Min, Max, and Ideal setpoints of one control mode to the next control mode in order of priority of the respective control mode. The control mode next in series may use the setpoint values of the previous control mode in its computation, and then output its own setpoint values.

Figures 6, 7A:
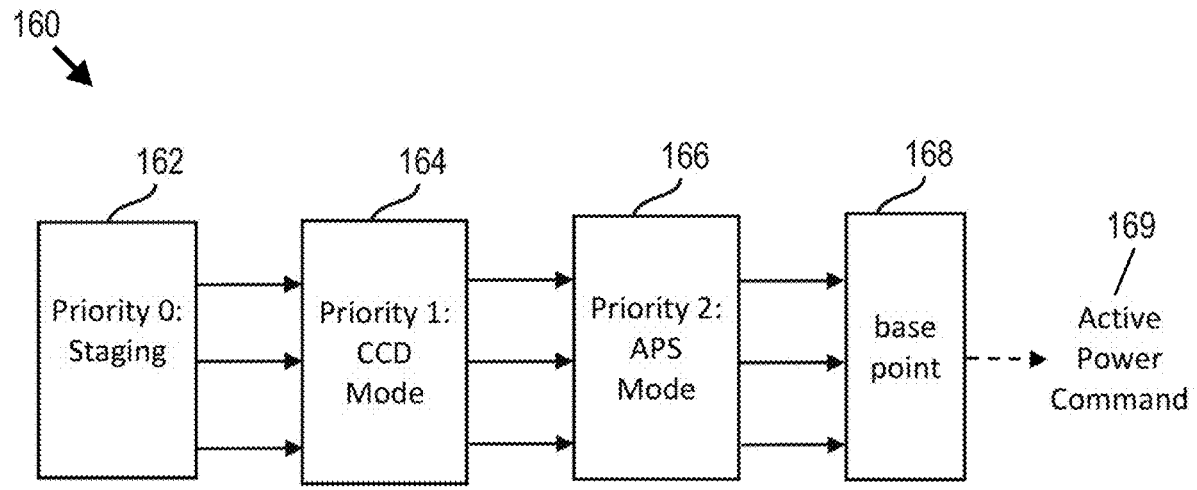

FIG. 6 is a first diagram illustrating a serial (or stacking) arrangement of different control modes 162, 164, 166 useable by a control system 160, with each control mode including multiple control signal candidate values, and with the serially connected control modes producing a single active power command. The highest priority, staging mode 162 consists of the operating limits of the BESS and is always the highest priority (e.g., Priority 0). Stacking control modes sequentially tests whether a lower priority mode's requirement is within the limits of a higher priority mode. If the lower priority mode is out of bounds, then the setpoints of the higher priority mode get preference by overriding setpoints of the lower priority mode. As shown, the next highest priority modes are CCD mode 164 and APS mode 166, respectively. A basepoint signal 168 is generated by identifying an intersection of control signal candidate values among the multiple control modes 162, 164, 166, or selecting an ideal value for a control mode 162, 164, 166 of highest priority, and in the present embodiment the basepoint signal 168 serves as a time-varying charge/discharge control signal (e.g., an active power command signal) 169 useable for controlling one or more components of a RES-BESS facility.

As noted previously, the staging mode is by default the highest priority mode and contains the present operating limits of the BESS. The Min and Max of this mode are calculated using the current operational state and conditions of the BESS. Examples of limits addressed by staging mode include fundamental system limits (e.g., energy source or self-imposed limits), nameplate and device limits (e.g., nameplate maximum voltage rating and nameplate active generation power rating at unity power factor)), and present operating limits (e.g., maximum voltage and maximum active generation power). As an example of energy source of self-imposed limits, consider that a system cannot produce power that it does not have available, and that limits on wattage may result from availability on solar resources and/or limits an inverter imposes on itself due to factors such as thermal conditions, errors, failures, etc.

FIGS. 7A-7E embody tables identifying control signal candidate values for multiple serially connected control modes and a net output value according to five different examples. In FIG. 7A, all control modes are within the bounds set by the higher priority mode, and a value of −20 MW is selected as the basepoint net output. In FIG. 7B, all control modes are outside the bounds set by the higher priority mode, and a value of 0 MW is selected as the basepoint net output. In FIG. 7C, all control modes partially overlap, and a value of 10 MW is selected as the basepoint net output. In FIG. 7D, the higher priority CCD mode can partially accommodate the lower priority APS mode, and a value of 10 MW is selected as the basepoint net output. In FIG. 7E, the higher priority CCD mode and lower priority APS mode setpoints conflict with one another, such that the value within CCD mode range and closest to the APS mode range (namely, 0 MW) is selected as the basepoint net output.

In certain embodiments, different control modes (or combinations of control modes) may be operated at different times.

Figure 8:
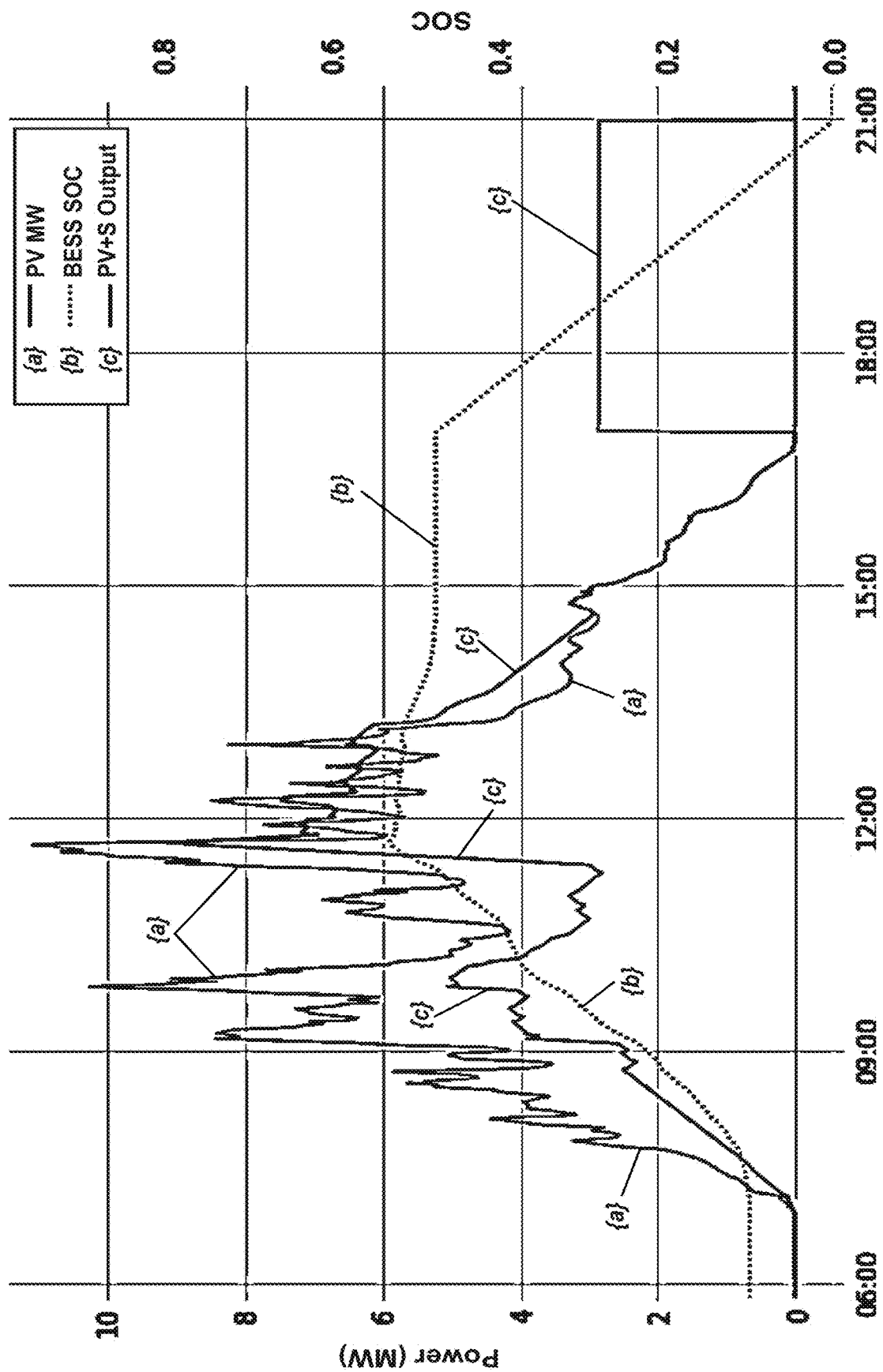
FIG. 8 is an exemplary output plot for system including a RES and a BESS chargeable with electric power produced by the renewable electrical energy generation resource, when controlled by a method utilizing different combinations of connected control modes at different times according to one embodiment, in accordance with some embodiments.

FIG. 8 is an exemplary output plot for system including a renewable electrical energy generation resource (e.g., a PV source) and an electrical energy storage device (e.g., a BESS) chargeable with electric power produced by the renewable electrical energy generation resource, when controlled by a method utilizing different combinations of connected control modes at different times according to one embodiment. The output plot includes PV MW, BESS SOC, and aggregated PV+S output energy supplied to an electric grid. APS mode plus CCD mode are enabled at sunrise (about 07:00) to reach 50% SOC by 12:00. Only APS mode is enabled from 12:00 until 14:30. Only CCD mode is enabled at sunset (about 17:00) to reach 0% SOC by 21:00. As shown in FIG. 8, combined PV+S output exhibits less peak-to-trough variation than PV MW during periods of significant PV MW fluctuation (e.g., from 08:00 through 14:00).

APS is a basepoint control mode that smooths PV+S plant output based on a specified ECP reference meter signal. In certain embodiments, APS may involve measuring current PV+S output at the POI with a grid, calculating a moving average of the ECP reference meter based on an APS filter time, calculating additional watts required based on (i) a deadband (extending ahead and behind of the moving average of reference power), (ii) a smoothing gradient, and (iii) the moving average of the ECP reference meter.

Figure 9:
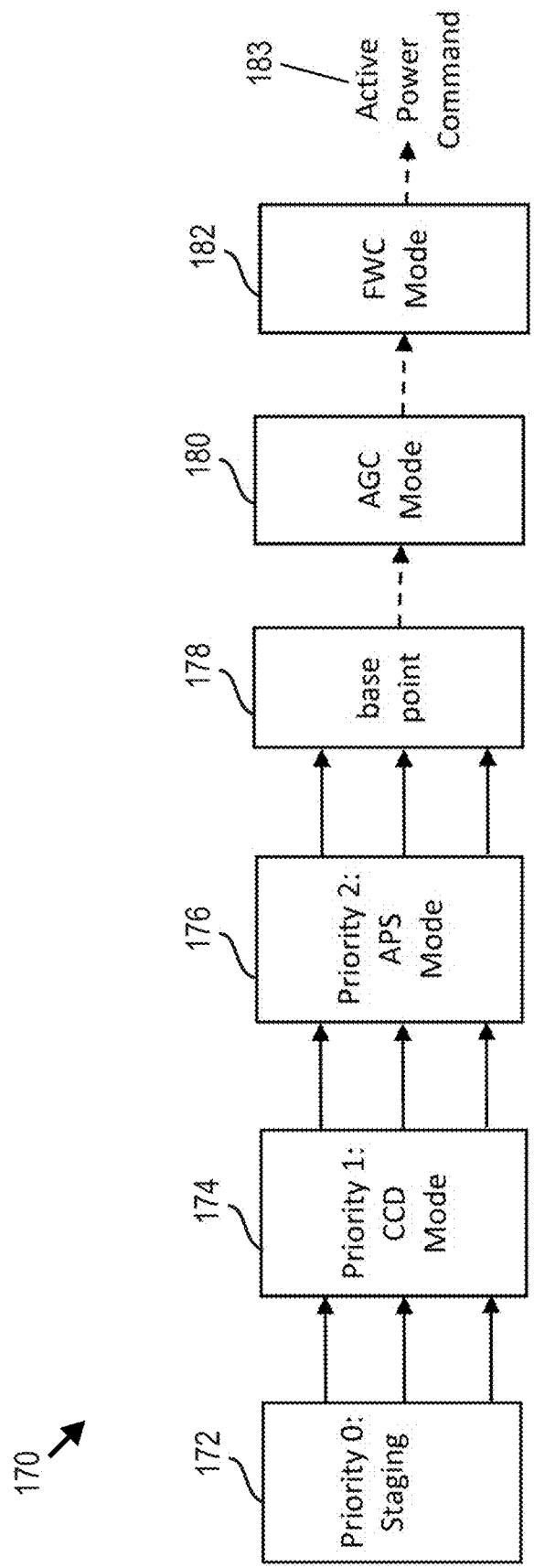
FIG. 9 is a second diagram illustrating a serial (or stacking) arrangement of different control modes including multiple control signal candidate values, including serially connected basepoint and non-basepoint control modes configured to produce a single active power command, in accordance with some embodiments.

FIG. 9 is a second diagram illustrating a serial (or stacking) arrangement of different control modes 172, 174, 176, 180, 182 useable by a control system 170. The control system 170 utilizes serially connected basepoint control modes 172, 174, 176 and non-basepoint control modes 180, 182 that produce a single active power command. Each control mode 172, 174, 176, 180, 182 includes multiple control signal candidate values. The highest priority, staging mode 172 consists of the operating limits of the BESS, and is followed (in decreasing priority) by CCD mode 172 and APS mode 174, respectively, to yield a basepoint value 178. The basepoint value 178 is generated by identifying an intersection of control signal candidate values among the preceding control modes 172, 174, 176, or selecting an ideal value for the preceding control mode of highest priority. This basepoint value 178 is modified (e.g., increased or decreased) by serial application of the AGC mode 180 and FWC mode 182, respectively. A time-varying charge/discharge control signal (e.g., an active power command signal) 183 results from modification of the basepoint value 178 with non-basepoint values generated by the AGC and FWC modes 180, 182. FIG. 9 therefore illustrates how AGC and FWC modes 180, 182 may add power to the basepoint. A typical implementation of additive modes may assume that some power from the BESS is reserved from the calculation of the basepoint value 178. For example, a 20 MW BESS may have 2 MW reserved for AGC and FWC modes. Therefore, the staging mode (priority 0) would only see −18 to 18 MW available. In one implementation, a basepoint value of −18 MW may be calculated, AGC mode may yield 2 MW, and FWC mode may yield −1 MW. An active power command of −17 MW may result (calculated as (−18)+(2)+(−1)). AGC mode is an additive power control mode that outputs a single PV+S power setpoint based on an active power target set by the master, wherein the AGC output is added on top of the basepoint value, subject to operating limit constraints of a RES-BESS (e.g., PV+S) facility.

FWC mode is an additive power control mode used to alter a system's power output in response to measured deviation from a specified nominal frequency. In certain embodiments, FWC may involve measuring grid frequency using the reference EPC meter. If the grid frequency is within a specified deadband or if the current BESS SOC is outside allowed usable SOC limits, then no action is performed. However, if the grid frequency is outside a specified deadband, then additional power to be provided is calculated using a measured droop.

In certain embodiments, ramp rate constraints may be applied to a control signal for a RES-BESS facility, wherein forecasted RES produced may be examined at every timestep, and power may be curtailed preemptively to mitigate RES production ramp down events (e.g., sudden dips in PV production). Ramp rate in this context may be defined as the change in power output of a RES facility or RES-BESS facility (e.g., PV+S facility) in a given time interval (e.g., change per minute or change per hour). Leveraging of short-term RES production forecasts may be used. The two main ramping events subject to control are (1) ramp down events, and (2) ramp up events. Ramp-down events in the context of a facility including PV production may be mitigated by obtaining a forecast for future PV from the current time to T minutes in the future, wherein T is a function of a ramp rate down limit. A gradient or slope between the current plant production and the forecasted PV power values may be calculated and compared with a defined ramp rate down limit. If the gradients of future power values are not within the ramp rate down limit, then PV power may be curtailed by an amount equal to the minimum gradient in the current forecast time series. If the gradients of future power values are within the ramp rate down limit, then no corrective action is necessary.

Controlling ramp rate up events is simpler. At every timestep, current RES (e.g., PV) production is compared with the plant production in the previous timestep. If the plant production is less than the current RES production, then curtailment may be applied to make sure that the RES plant output does not violate the ramp limit. This function may be performed by inverters at the RES-BESS plant. This may be applied in two instances. Firstly, if there is a sudden increase in RES production, this logic will control plant production so that total output increases in steps of power that are less than equal to the ramp rate up limit. Secondly, if energy had been curtailed in the previous timestep to sustain a ramp rate down event, the RES-BESS plant output is increased by no greater than the ramp rate up limit to bring the curtailment back to zero. After ramp rate up curtailment power has been calculated, gradients to forecasted RES production values are recalculated for the ramp-up curtailment. If the result of the current ramp rate up event causes uncontrollable violations in the future, then an optimal curtailment solution is obtained so that all future violations are controlled.

Figure 10:
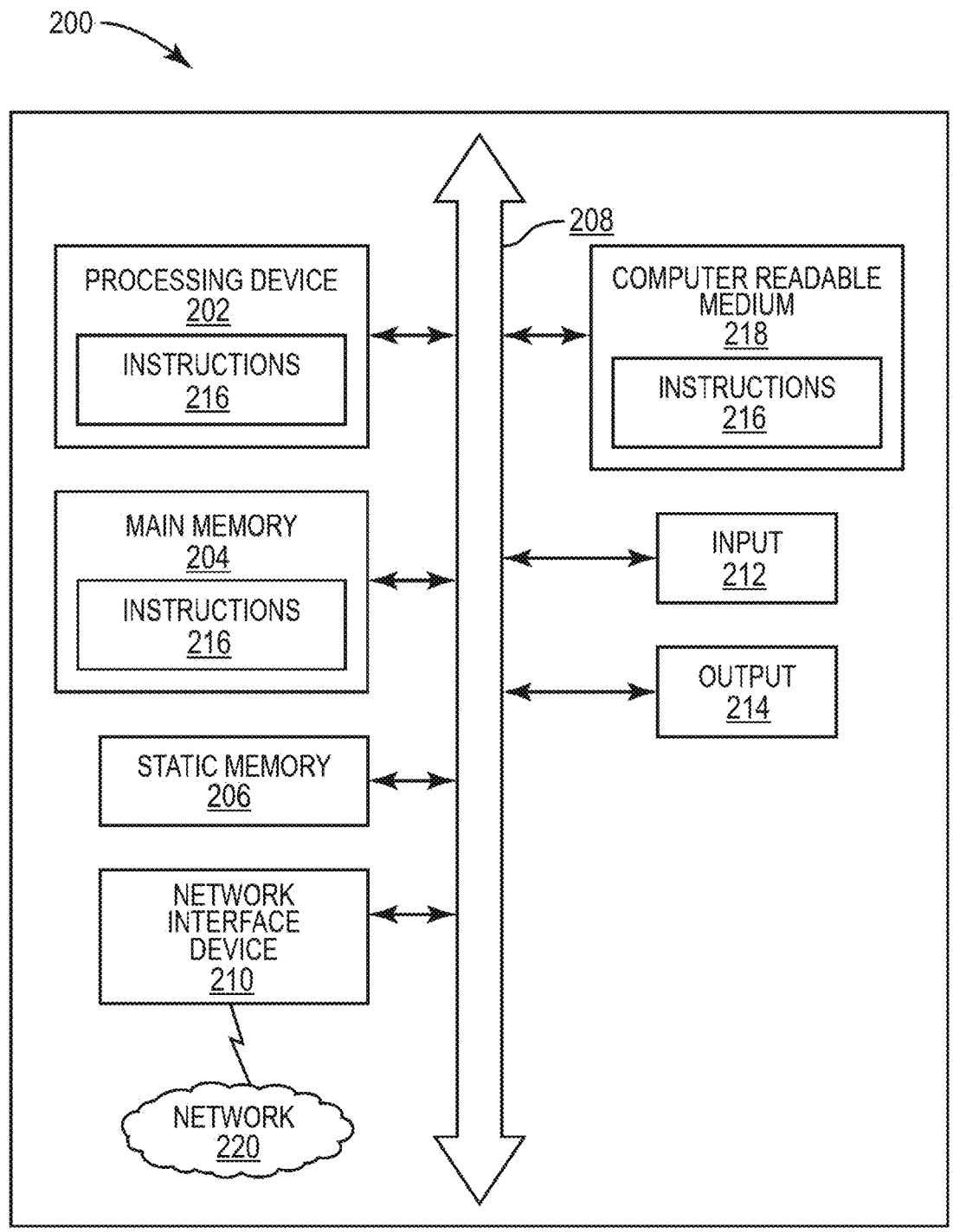
FIG. 10 is schematic diagram of a generalized representation of a computer system that can be included as one or more components of a system for controlling a renewable electrical energy generation resource and an electrical energy storage device chargeable with electric power produced by the renewable electrical energy generation resource, according to one embodiment, in accordance with some embodiments.

FIG. 10 is schematic diagram of a generalized representation of a computer system 200 that can be included as one or more components of a system for controlling a renewable electrical energy generation resource and an electrical energy storage device chargeable with electric power produced by the renewable electrical energy generation resource, according to one embodiment. The computer system 200 may be adapted to execute instructions from a computer-readable medium to perform these and/or any of the functions or processing described herein.

The computer system 200 may include a set of instructions that may be executed to program and configure programmable digital signal processing circuits for supporting scaling of supported communications services. The computer system 200 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 200 may be a circuit or circuits included in an electronic board or card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 200 in this embodiment includes a processing device or processor 202, a main memory 204 (e.g., read-only memory (ROM), flash memory, dynamic random access memory (DRAM), such as synchronous DRAM (SDRAM), etc.), and a static memory 206 (e.g., flash memory, static random access memory (SRAM), etc.), which may communicate with each other via a data bus 208. Alternatively, the processing device 202 may be connected to the main memory 204 and/or static memory 206 directly or via some other connectivity means. The processing device 202 may be a controller, and the main memory 204 or static memory 206 may be any type of memory.

The processing device 202 represents one or more general-purpose processing devices, such as a microprocessor, central processing unit (CPU), or the like. In certain embodiments, the processing device 202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 202 is configured to execute processing logic in instructions for performing the operations and steps discussed herein.

The computer system 200 may further include a network interface device 210. The computer system 200 may additionally include at least one input 212, configured to receive input and selections to be communicated to the computer system 200 when executing instructions. The computer system 200 also may include an output 214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 216 stored in a computer readable medium 218. The instructions 216 may also reside, completely or at least partially, within the main memory 204 and/or within the processing device 202 during execution thereof by the computer system 200, the main memory 204 and the processing device 202 also constituting computer readable medium. The instructions 216 may further be transmitted or received over a network 220 via the network interface device 210.

While the computer readable medium 218 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, an optical medium, and/or a magnetic medium.

In certain embodiments, systems and apparatuses disclosed herein may utilize a non-transitory computer readable medium containing program instructions for controlling, by at least one processor, (i) a renewable electrical energy generation resource and (ii) an electrical energy storage device chargeable with electric power produced by the renewable electrical energy generation resource, the method comprising utilizing, by the at least one processor, (A) a time-dependent forecast of electrical energy production by the renewable electrical energy generation resource and (B) a SOC schedule for the electrical energy storage device including at least one SOC target value, to generate a time-varying charge/discharge control signal for the electrical energy storage device, wherein the time-varying charge/discharge control signal is configured to ensure that the SOC schedule is satisfied by charging at the average rate necessary to meet the SOC target schedule, while periodically updating the generation of the time-varying charge/discharge control signal based upon at least one of an updated time-dependent forecast of electrical energy production or an updated SOC schedule. In certain embodiments, the program instructions contained in the computer readable medium may be configured to perform additional method steps as disclosed herein.

Figure 11A:
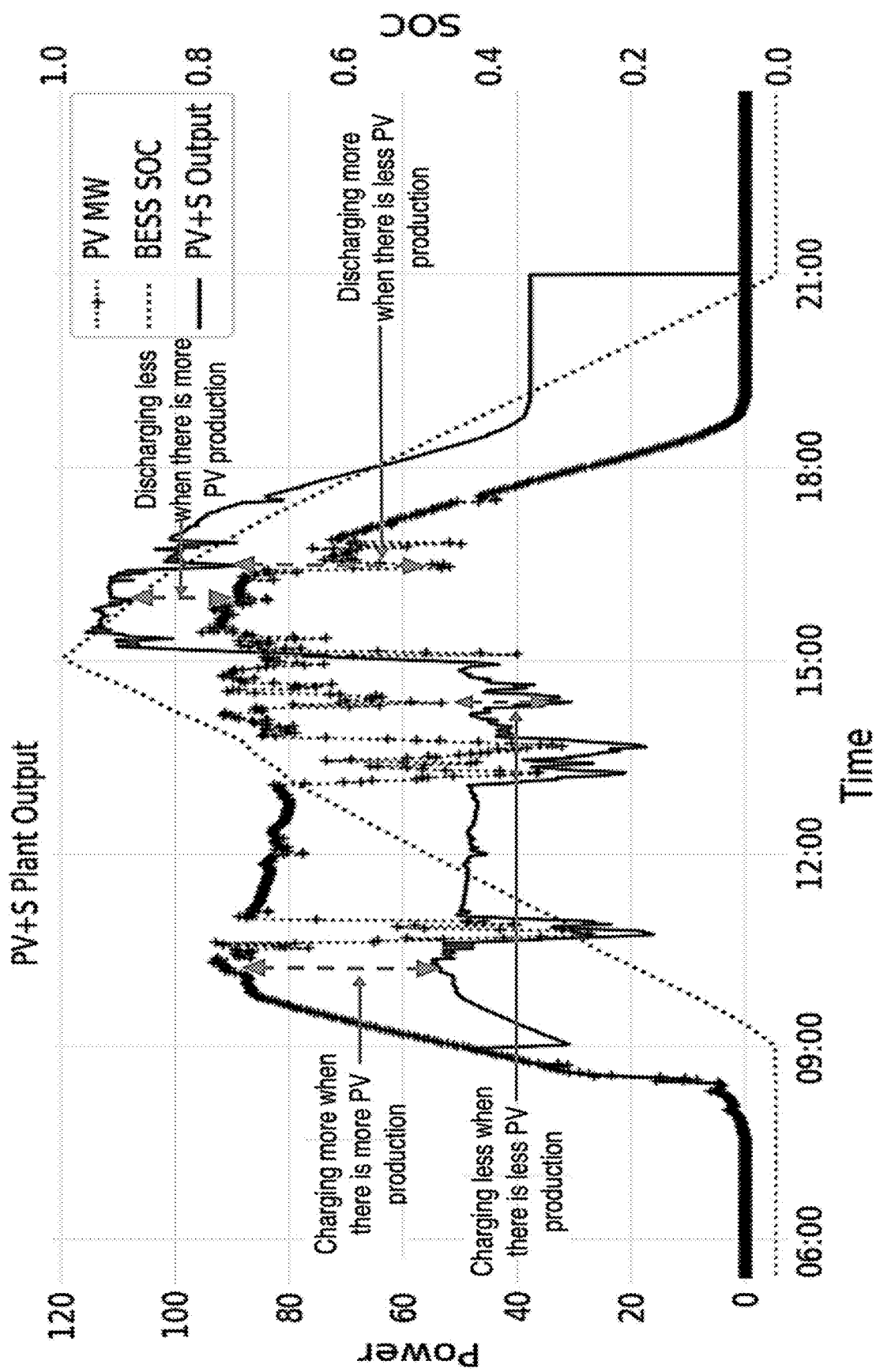
FIG. 11A is a modeled output plot for a system including a RES and a BESS chargeable with electric power produced by the RES, when controlled by a method as disclosed herein but without a configurable refresh period, for a period including 06:00 to 21:00 of a single day, in accordance with some embodiments.
Figure 11B:
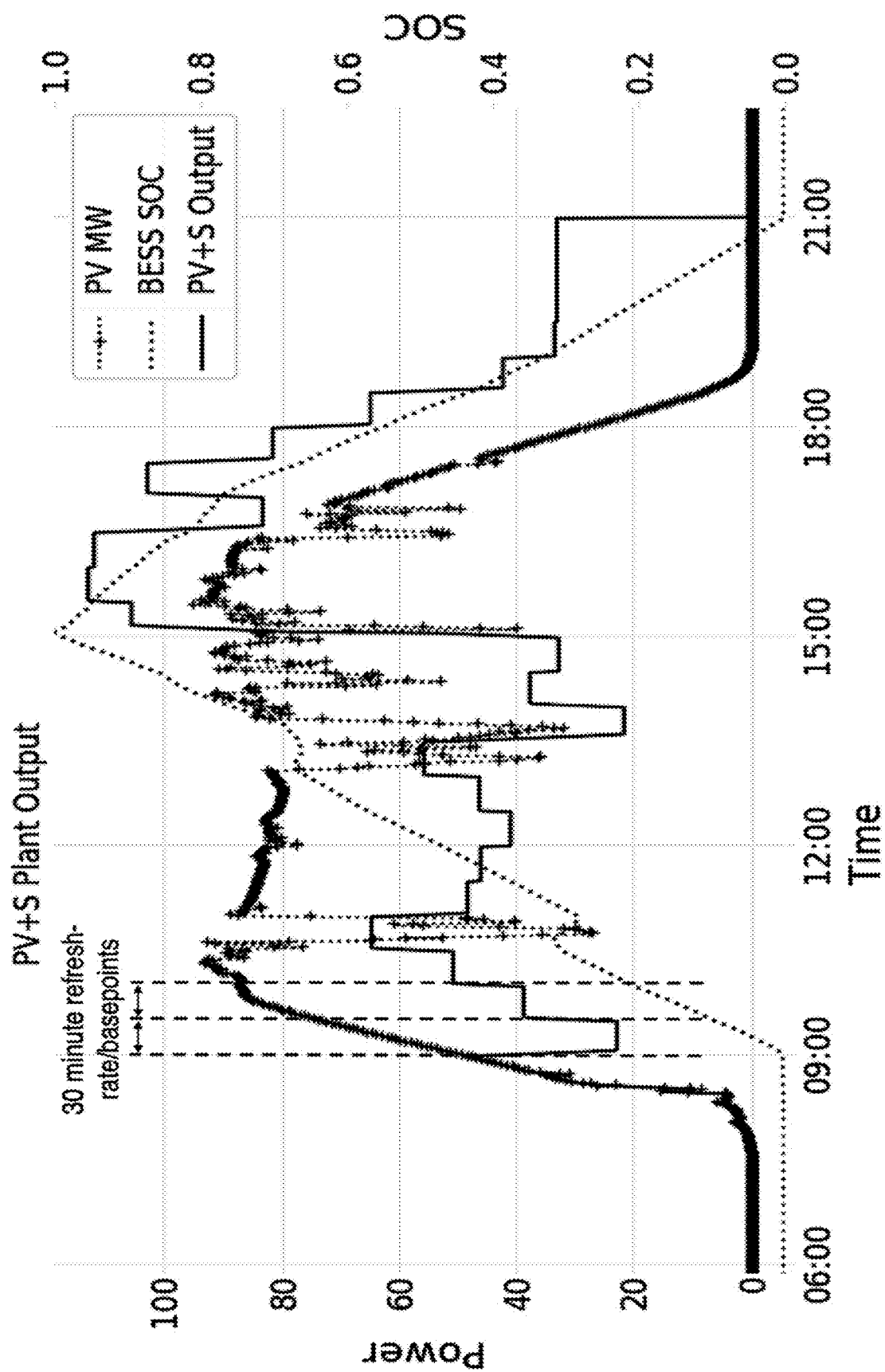
FIG. 11B is a modeled output plot for the same RES-BESS system and period depicted in FIG. 11A, when controlled by a method disclosed herein with utilization of a 30 minute refresh period, in which basepoint value is recalculated once every 30 minutes, in accordance with some embodiments.

FIGS. 11A and 11B are provided to permit visual comparison of the effects of not utilizing versus utilizing a refresh period to limit recalculation of basepoint values for controlling aggregate output of a RES-BESS facility. FIG. 11A is a modeled output plot for a system including a RES in the form of PV and a BESS chargeable with electric power produced by the renewable electrical energy generation resource, when controlled by a method as disclosed herein but without a configurable refresh period, for a period including 06:00 to 21:00 of a single day. Significant temporal fluctuation in aggregated PV+S output is shown between 09:00 and 18:00, with very few time periods having a non-zero slope that would correspond to constant power output. These fluctuations in plant output would inhibit the ability of a plant operator to participate by bidding to supply fixed blocks of power for specified periods of time in energy markets and/or energy balance markets.

FIG. 11B is a modeled output plot for the same RES-BESS system and period depicted in FIG. 11A, when controlled by a method disclosed herein with utilization of a 30 minute refresh period, in which basepoint value is recalculated once every 30 minutes. As shown, the aggregated PV+S output remains substantially constant for each 30 minute time period, since the basepoint control value remains constant during each 30 minute refresh period. The application of a refresh period for coordinate control of a RES-BESS facility enables the plant to supply fixed blocks of power for specified time periods, thereby permitting the plant operator to participate by bidding to supply fixed blocks of power for specified periods of time in energy markets and/or energy balance markets.

Figure 12A:
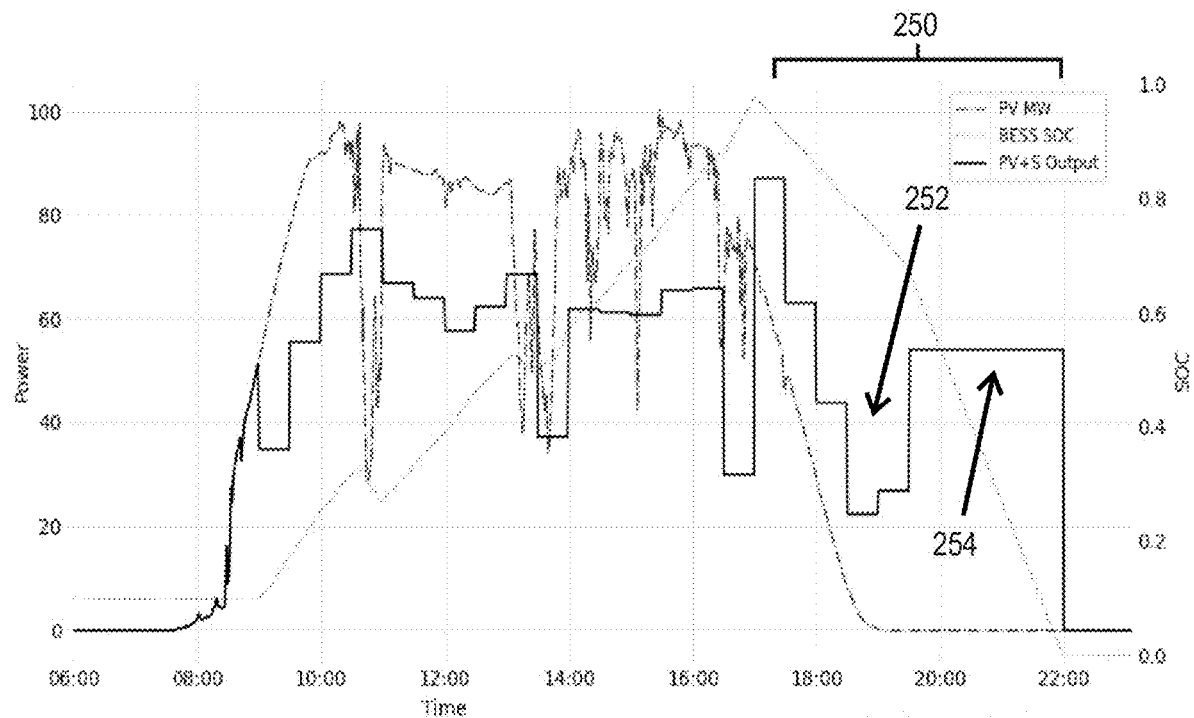
FIGS. 12A and 12B provided modeled output plots for a system including a RES and a BESS chargeable with electric power produced by the RES, each utilizing a refresh period, but with FIG. 12B using a static window that takes into account the solar production forecast from the beginning of the control period until the end in to meet a SOC target schedule, in accordance with some embodiments.
Figure 12B:
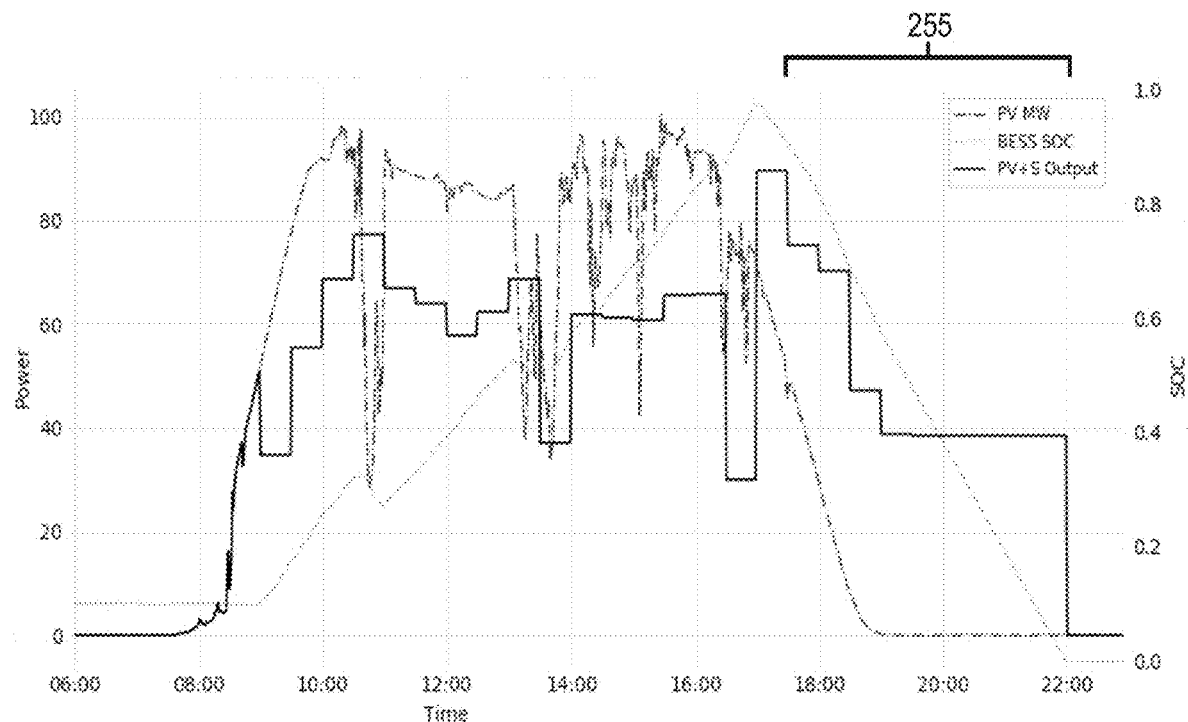

FIGS. 12A and 12B provided modeled output plots for a system including a RES (e.g., PV) and BESS chargeable with electric power produced by the RES. The output plots of FIGS. 12A and 12B exhibit utilization of a refresh period, but only the output plot of FIG. 12B avoids an undesirable valley in aggregated plant (PV+S) output after daily PV production has ended, followed by an increase in PV+S output during discharge of the BESS. The output plot of FIG. 12A corresponds to a control scheme that utilizes a SOC compliance evaluation period that considers only hours remaining the day for each time period—namely, from the current time to an end of day SOC target (e.g., 22:00 hours in each figure). The limitation of this approach is that it may not discharge a BESS rapidly enough when RES (e.g., PV) production drops and stays low through the end of a day. Additionally, the approach in FIG. 12A leads to a diminishing average power problem. When the window is updated to be smaller and smaller as the current time increments and the end of the window remains constant, during a natural ramp down the average tends to always be lower than the current power. This results in the algorithm estimating a lower basepoint and causes the valley 252 that is apparent in FIG. 12A. Although a zero SOC target is attained at 22:00 in each of FIGS. 12A and 12B, and each figure is substantially identical from the start of day until about 17:00, the output plots of FIGS. 12A and 12B differ significantly between 17:00 and 22:00. FIG. 12A provides a PV+S profile 250 between 17:00 and 22:00 that includes a valley region 251 in which PV+S output declines to a minimum of about 22 MW followed by a PV+S increase region 254 in which PV+S output is increased to a value of nearly 50 MW before declining rapidly to zero at 22:00. In contrast, FIG. 12B provides a different PV+S profile 255 that is devoid of any valleys followed by positive slope regions that would correspond to increases in PV+S output. In particular, the PV+S profile 255 shown in FIG. 12B decreases in a substantially stepwise manner between 17:00 and 22:00, with a final drop from about 30 MW to zero at 22:00. This improved PV+S profile 255 shown in FIG. 12B may be attained by utilization of a static window instead of a dynamic window for meeting an end of day SOC target. Furthermore, while the window length is static, the forecasted power values in the window are updated as the facility receives updated forecasts. While specific aspects, features and illustrative embodiments have been disclosed herein, it will be appreciated that the disclosure extends to and encompasses numerous other variations, modifications, and alternative embodiments, as will suggest themselves to those of ordinary skill in the pertinent art, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

Figure 17:
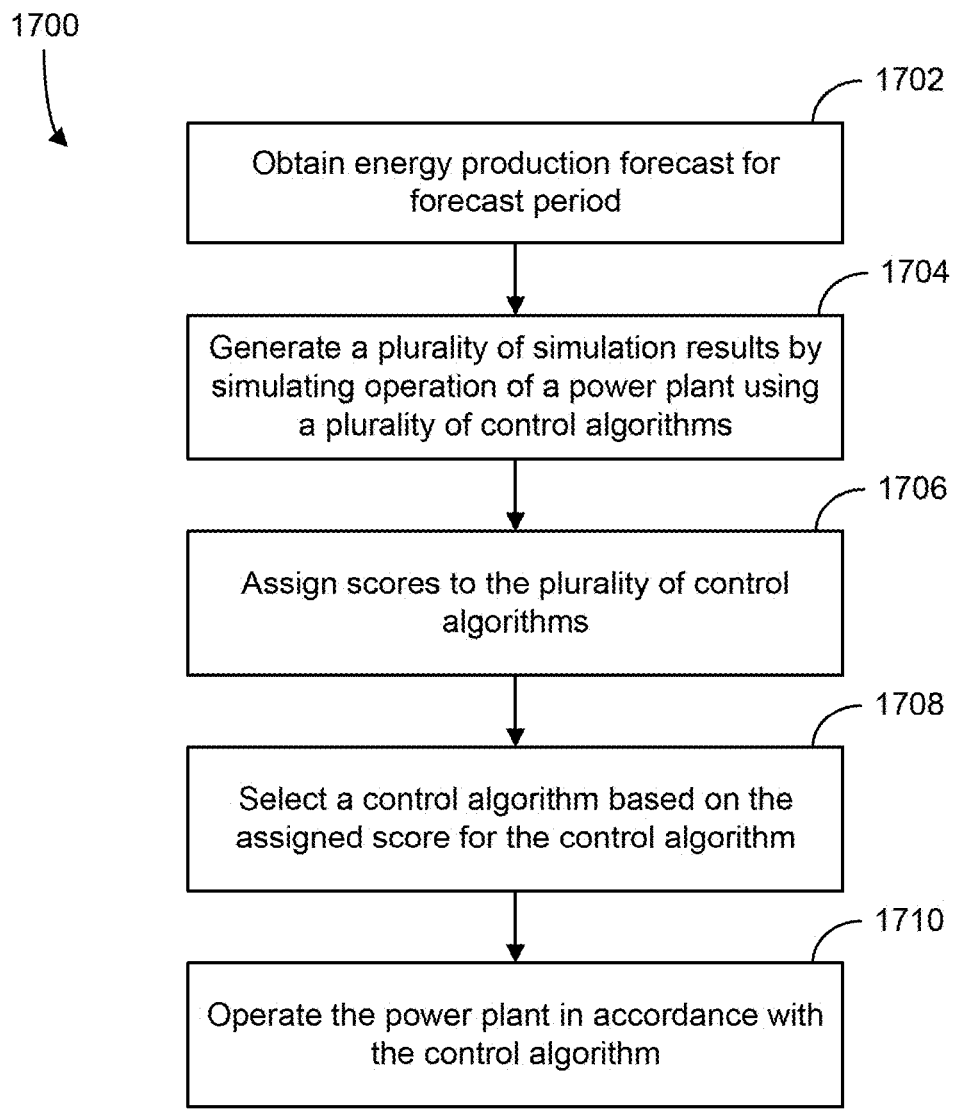
FIG. 17 illustrates a flowchart for target function prioritization of control modes, in accordance with some embodiments.

FIG. 17 illustrates a flowchart of a method 1700 for target function prioritization of control modes, in accordance with some embodiments. Method 1700 can be performed by a data processing system (e.g., ESS controller 22, a computer of computing system 1801, shown and described with reference to FIG. 18, a processor of a computing device, etc.). Method 1700 may include more or fewer operations and the operations may be performed in any order. Performance of method 1700 may enable a data processing system that is controlling an electric power plant to establish control algorithm prioritization sequences to optimize the amount of energy that is delivered to a power grid and/or satisfy some other criterion or criteria for a forecast time period. Performance of method 1700 may further enable the data processing system to change a control algorithm priority selection in response to a change in the criteria that is applied to generate the priorities.

At operation 1702, the data processing system obtains an energy production forecast of an electric power plant for a forecast period. The data processing system may obtain the energy production for the time period by calculating the amount of energy the electric power plant is likely to generate for the forecast period. The data processing system may calculate the amount of energy the electric power plant is likely to generate by identifying a weather forecast for the forecast period and simulating the amount of energy the renewable energy sources of the electric power plant can generate based on the forecast according to a defined set of rules. For example, the data processing system may store a table in memory that indicates the amount of energy a series of solar panels in the plant can generate based on a forecast amount of sunlight. The data processing system may similarly store a table in memory that indicates the amount of energy a series of windmills can generate based on a forecast amount of wind that will blow over the windmills. The data processing system may compare the predicted weather with the tables to predict how much energy the electric power plant will generate during the forecast period. The data processing system may predict an amount of energy that the electric power plant will generate for any type of weather forecast and/or type of renewable energy.

In some embodiments, the data processing system may aggregate the energy that can be generated from each renewable energy source of the electric power plant over time to predict the amount of energy the electric power plant will likely generate during a forecast period at different times within the forecast period. By doing so, the data processing system may determine a total amount of energy the electric power plant will generate for individual time steps of the forecast period. The data processing system may aggregate the total amount of energy with the actual or expected amount of energy the electric power plant has stored when the forecast period begins to predict the total amount of energy the data processing system will have available to distribute and/or to store for each of the time steps. The data processing system may store the aggregated values in memory.

At operation 1704, the data processing system generates a plurality of simulation results. The data processing system may generate the simulation results by simulating operation of the electric power plant using control algorithms and based on the energy production forecast. For example, the data processing system may retrieve a plurality of control algorithms from memory. A control algorithm may be or include a single control mode or a prioritized stack of control modes that indicates how to operate the electric power plant and/or distribute energy from the electric power plant for a time step of the forecast period. For each control algorithm, the data processing system may calculate the SOC of the battery of the electric power plant and the amount of energy that has been delivered to a load, such as to a POI of a power grid, for each time step of the forecast period. The data processing system may do so by applying preset rules of the control mode or control modes of the individual control algorithms to the energy production forecast for the individual time steps. For instance, for a time step at 11:00, the data processing system may identify an amount of energy that will have been generated and/or is available in the battery of the electric power plant. The data processing system may then identify the rules for the different retrieved control algorithms (including the rules for stacked control modes, if applicable) that can be used to control the electric power plant at the time step. The data processing system may separately apply each set of rules to the generated and/or available energy to determine an SOC of the battery, the total amount of energy that has been distributed, or other characteristics about the electric power plant (e.g., ramp rate and/or deviation from desired target metrics) for the simulation for each control algorithm. The data processing system can similarly determine characteristics of the electric power plant for each control algorithm for each time step of the forecast period.

In some embodiments, the data processing system may retrieve the control algorithms by retrieving the identifications of individual control modes from memory and creating different combinations or permutations of the control modes. For example, the data processing system may retrieve control mode A, control mode B, control mode C, and control mode D from memory. The data processing system may create multiple control algorithms comprising different permutations of priorities of the control modes A, B, C, and D, including combinations or permutations that only include a subset (e.g., three or less) of the control modes. In some embodiments, the data processing system may store the different control algorithms, including the different stacks of control modes and their corresponding prioritizations, in memory. In such embodiments, the data processing system may simply retrieve the control algorithms from memory to simulate operation of the electric power plant under each control algorithm. The data processing system may then calculate the characteristics of the power plant at the time steps that would likely result from each control algorithm and store the calculated values in memory.

At operation 1706, the data processing system assigns scores to the plurality of control algorithms. The data processing system may assign the scores to the plurality of control algorithms by storing the scores in memory with associations with the respective control algorithms. The data processing system may assign the scores based on the simulation results (e.g., the energy distribution and state of charge of the battery for individual time steps of the energy forecast) and a defined set of criteria. The defined set of criteria may be or include rules related to the simulation results that assign scores to various values of the simulation results. For example, a criterion may be to assign a value of 150,000 to a control algorithm if the control algorithm delivers 15 MW of power to a power grid. Another criterion may be to assign a score of 10,000 to a control algorithm if the control algorithm causes the battery of the electric power plant to have an SOC of less than 90%. Such criteria may be input by a user. Users may input any number and/or type of criteria.

In some cases, the rules may be specific to different time steps. For example, a current state of charge of the battery at 18:00 of the electric power plant may be 20%. A rule may indicate that a 20% state of charge of a battery at 18:00 has a value of 150,000. Another rule may indicate that a total amount of energy delivered to a power grid between the time steps of 00:00 and 04:59 is 100 per KWh. Rules may be associated with any value for any time period and for any simulated result. To determine the scores for control algorithms for individual time steps, the data processing system may apply the rules that are associated with the individual time steps to the corresponding simulated results.

In some embodiments, to determine the score for a control algorithm for a time step, the data processing system may aggregate the scores the data processing system generated for the control algorithm and time step. Depending on the data processing system's configuration, the data processing system may do so based on every rule that the data processing system has stored or based on a subset of the rules. For example, the data processing system may be configured to store rules that assign scores to control algorithms separately based on the predicted charge and distributed energy associated with a control algorithm. An administrator may toggle between which types of rules to use to assign scores (e.g., rules for the predicted charge, rules for the distributed energy, or rules for both) to cause the data processing system to assign scores to the control algorithms using only the rules that the administrator selects (and any score values and/or rules that the administrator sets).

In some embodiments, the criteria may include limiting requirements. For example, one rule may indicate that the total amount of energy distributed to the power grid cannot exceed 20 MW. Another rule may indicate that the total charge of the battery shall not be less than 10% of the capacity of the battery. If the simulated results for a control algorithm indicates that either or both of these rules are broken (e.g., a simulated implementation of a control algorithm indicated the amount of energy delivered to the power grid would exceed an upper threshold or the total charge of the battery to be less than the minimum threshold if the control algorithm were implemented), the data processing system may assign a null value (e.g., a null flag or a large negative number) to the control algorithm to indicate the algorithm cannot be used. Other examples of rules include an automatic prioritization of a control algorithm (e.g., assign a highest score or a prioritization flag to the control algorithm or assign null values to the other control algorithms) for a specific time step or only considering control algorithms with stacked control modes with a particular control mode prioritized the highest within the respective stack (e.g., assign null values to stacks of control modes that do not have the particular control mode prioritized the highest).

In some embodiments, the data processing system may assign priorities (e.g., rankings) to the control algorithms based on their respective scores. For example, after determining the scores for the different control algorithms, the data processing system may compare the scores for the different control algorithms for each time step. Based on the comparison, the data processing system may rank or assign priorities to the different control algorithms in descending order starting with the control algorithm that was assigned the highest score. The data processing system may rank or assign priorities to the control algorithms for each individual time step of the forecast period and store such rankings or priorities in memory.

At operation 1708, the data processing system may select a control algorithm based on the assigned score of the control algorithm. To do so, the data processing system may identify the control algorithm that has been assigned the highest score (or lowest score, depending on how the rules and/or data processing system are configured) of the stored control algorithms. In embodiments in which the data processing assigns a null flag to control algorithms that do not meet a defined criteria or exceed a limit for a time step, the data processing system may first discard the control algorithms with the null flag (e.g., remove the scores with the null flags from memory or remove such scores from a data set including the scores that is being evaluated). The data processing system may then compare the scores of the remaining control algorithms to each other and identify the control algorithm with the highest score. The data processing system may select the control algorithm with the highest score based on the comparison to use to control the electric power plant for the forecast period. In cases in which a control algorithm has been assigned a prioritization flag, the data processing system may select the control algorithm based on the prioritization flag. The data processing system may store the selected control algorithm and/or an identification of the selection in memory.

The data processing system may select a control algorithm for each of the time steps of the forecast period based on the assigned scores for the control algorithms. For example, the data processing system may identify the scores of the control algorithms for each time step of the forecast period. The data processing system may discard any null scores for control algorithms and compare the remaining scores for each time step. The data processing system may identify the highest score and corresponding control algorithm for each time step and store the score and/or identification of the control algorithm in memory such that the control algorithm can be retrieved for control at the respective time step.

In embodiments in which the data processing system assigns priorities to the different control algorithms, the data processing system may select the control algorithm with the highest priority. For example, for each time step of the forecast period, the data processing system may compare the priorities of the control algorithms. The data processing system may identify and select the control algorithm with the highest priority for each time step.

At operation 1710, the data processing system may operate the power plant in accordance with the selected control algorithm. For example, the data processing system may identify the prioritizations of the control mode or control modes of the selected control algorithm and distribute energy and/or otherwise control the applicable components of the electric power plant according to the control mode or control modes. In embodiments in which the data processing system selects control modes for multiple time steps into the future, the data processing system may maintain an internal clock and adjust operation of the electric power plant according to the selected control modes at each of the time steps. Accordingly, the data processing system may control the energy power plant to ensure it operates according to set criteria.

In some embodiments, the data processing system may recalculate the prioritizations of the control modes for the different time steps in the middle of the time period of the energy forecast. The data processing system may do so to adjust for any change in the amount of energy the renewable resources were able to generate during the forecast period and/or based on a change in criteria as input by an operator. For example, after initially performing operations 1702-1710 and operating the electric power plant according to the control modes prioritizations of a first time step, the data processing system may receive an input with new criteria indicating how to score control algorithms. Upon receiving the new criteria, the data processing system may recalculate the control algorithm prioritizations for the remaining time steps of the forecast period and operate according to the new prioritizations for the forecast period. In another example, the data processing system may receive a signal indicating that less or more energy has been generated during the forecast than expected (e.g., the difference between the predicted and actual amount of energy that was generated exceeds or is less than, respectively, a threshold) under the energy forecast. Upon receiving the signal, the data processing system may recalculate the prioritizations for the control algorithms for the remaining time steps of the forecast period and control the electric power plant according to the recalculated prioritizations.

Computer Systems

Figure 18:
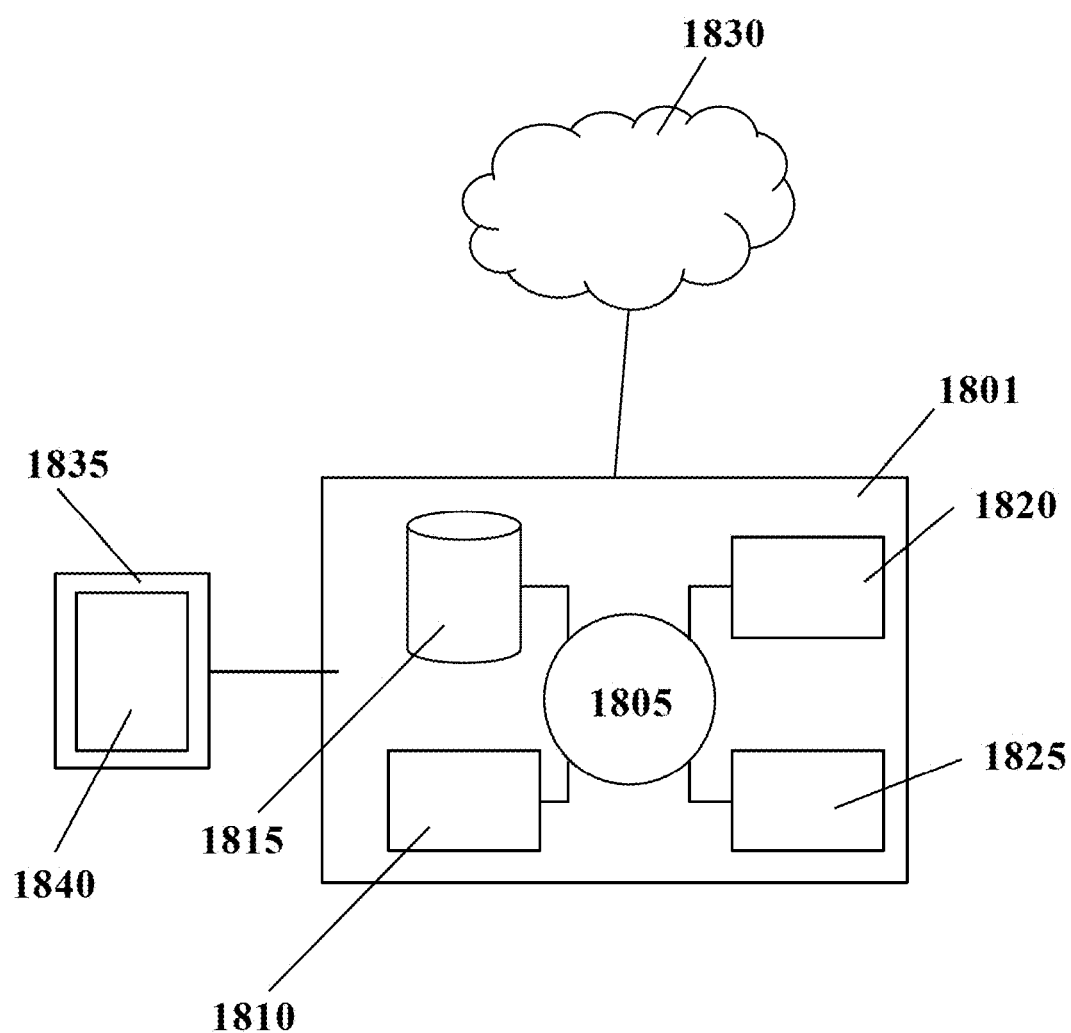
FIG. 18 illustrates a computer system that is programmed or otherwise configured to implement methods provided herein, in accordance with some embodiments.

The present disclosure provides computer systems that are programmed to implement methods of the disclosure. FIG. 18 shows a computer system 1801 that is programmed or otherwise configured to, for example, execute one or more control algorithms, execute one or more control algorithm in a virtual environment, execute one or more simulations, assign a score to one or more simulations, assign a score to one or more control algorithms, generate a score for one or more simulations, generate a score for one or more control algorithms, select an optimal control algorithm from one or more control algorithms, generate one or more energy production forecasts, generate one or more economic forecasts, generate one or more degradation forecasts of a device, or any combination thereof.

The computer system 1801 may regulate various aspects of analysis, calculation, and generation of the present disclosure, such as, for example, executing one or more control algorithms, executing one or more control algorithm in a virtual environment, executing one or more simulations, assigning a score to one or more simulations, assigning a score to one or more control algorithms, generating a score for one or more simulations, generating a score for one or more control algorithms, selecting an optimal control algorithm from one or more control algorithms, generating one or more energy production forecasts, generating one or more economic forecasts, generating one or more degradation forecasts of a device, or any combination thereof. The computer system 1801 may be an electronic device of a user or a computer system that is remotely located with respect to the electronic device. The electronic device may be a mobile electronic device.

The computer system 1801 includes a central processing unit (CPU, also "processor" and "computer processor" herein) 1805, which may be a single core or multi core processor, or a plurality of processors for parallel processing. The computer system 1801 also includes memory or memory location 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 may be a data storage unit (or data repository) for storing data. The computer system 1801 may be operatively coupled to a computer network ("network") 1830 with the aid of the communication interface 1820. The network 1830 may be the Internet, an internet and/or extranet, or an intranet and/or extranet that is in communication with the Internet.

The network 1830 in some cases is a telecommunication and/or data network. The network 1830 may include one or more computer servers, which may enable distributed computing, such as cloud computing. For example, one or more computer servers may enable cloud computing over the network 1830 ("the cloud") to perform various aspects of analysis, calculation, and generation of the present disclosure, such as, for example, executing one or more control algorithms, executing one or more control algorithm in a virtual environment, executing one or more simulations, assigning a score to one or more simulations, assigning a score to one or more control algorithms, generating a score for one or more simulations, generating a score for one or more control algorithms, selecting an optimal control algorithm from one or more control algorithms, generating one or more energy production forecasts, generating one or more economic forecasts, generating one or more degradation forecasts of a device, or any combination thereof. Such cloud computing may be provided by cloud computing platforms such as, for example, Amazon Web Services (AWS), Microsoft Azure, Google Cloud Platform, and IBM cloud. The network 1830, in some cases with the aid of the computer system 1801, may implement a peer-to-peer network, which may enable devices coupled to the computer system 1801 to behave as a client or a server.

The CPU 1805 may comprise one or more computer processors and/or one or more graphics processing units (GPUs). The CPU 1805 may execute a sequence of machine-readable instructions, which may be embodied in a program or software. The instructions may be stored in a memory location, such as the memory 1810. The instructions may be directed to the CPU 1805, which may subsequently program or otherwise configure the CPU 1805 to implement methods of the present disclosure. Examples of operations performed by the CPU 1805 may include fetch, decode, execute, and writeback.

The CPU 1805 may be part of a circuit, such as an integrated circuit. One or more other components of the system 1801 may be included in the circuit. In some cases, the circuit is an application specific integrated circuit (ASIC).

The storage unit 1815 may store files, such as drivers, libraries and saved programs. The storage unit 1815 may store user data, e.g., user preferences and user programs. The computer system 1801 in some cases may include one or more additional data storage units that are external to the computer system 1801, such as located on a remote server that is in communication with the computer system 1801 through an intranet or the Internet.

The computer system 1801 may communicate with one or more remote computer systems through the network 1830. For instance, the computer system 1801 may communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user may access the computer system 1801 via the network 1830.

Methods as described herein may be implemented by way of machine (e.g., computer processor) executable code stored on an electronic storage location of the computer system 1801, such as, for example, on the memory 1810 or electronic storage unit 1815. The machine executable or machine readable code may be provided in the form of software. During use, the code may be executed by the processor 1805. In some cases, the code may be retrieved from the storage unit 1815 and stored on the memory 1810 for ready access by the processor 1805. In some situations, the electronic storage unit 1815 may be precluded, and machine-executable instructions are stored on memory 1810.

The code may be pre-compiled and configured for use with a machine having a processor adapted to execute the code, or may be compiled during runtime. The code may be supplied in a programming language that may be selected to enable the code to execute in a pre-compiled or as-compiled fashion.

Aspects of the systems and methods provided herein, such as the computer system 1801, may be embodied in programming. Various aspects of the technology may be thought of as "products" or "articles of manufacture" typically in the form of machine (or processor) executable code and/or associated data that is carried on or embodied in a type of machine readable medium. Machine-executable code may be stored on an electronic storage unit, such as memory (e.g., read-only memory, random-access memory, flash memory) or a hard disk. "Storage" type media may include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1801 may include or be in communication with an electronic display 1835 that comprises a user interface (UI) 1840 for providing, for example, a clinical intervention for a subject. Examples of UIs include, without limitation, a GUI and web-based user interface.

Methods and systems of the present disclosure may be implemented by way of one or more algorithms. An algorithm may be implemented by way of software upon execution by the central processing unit 1805. The algorithm can, for example, execute one or more control algorithms, execute one or more control algorithm in a virtual environment, execute one or more simulations, assign a score to one or more simulations, assign a score to one or more control algorithms, generate a score for one or more simulations, generate a score for one or more control algorithms, select an optimal control algorithm from one or more control algorithms, generate one or more energy production forecasts, generate one or more economic forecasts, generate one or more degradation forecasts of a device, or any combination thereof.

What is claimed is:

1. A method of operating a power plant, comprising:
obtaining an energy production forecast for a forecast period;
generating a plurality of simulation results associated with simulated operation of the power plant for the forecast period, wherein the plurality of simulation results are generated by simulating operation of the power plant using a plurality of control algorithms and the energy production forecast, wherein each of the plurality of control algorithms correspond to different pre-set rules for applying control modes;
assigning a score to each of the plurality of control algorithms based on the generated plurality of simulation results;
selecting a control algorithm from the plurality of control algorithms for the forecast period based on the assigned score for the control algorithm; and
operating the power plant in accordance with the control algorithm for a duration of the forecast period.

2. The method of claim 1, further comprising:
comparing the assigned scores between each of the plurality of control algorithms; and
assigning priorities to each of the plurality of control algorithms based on the assigned scores.

3. The method of claim 2, wherein selecting the control algorithm comprises selecting the control algorithm responsive to the control algorithm having a highest priority of the assigned priorities.

4. The method of claim 1, wherein the plurality of control algorithms comprises a synthetic control algorithm, the synthetic control algorithm comprising stacked control modes having a priority order.

5. The method of claim 1, wherein the energy production forecast is based on one or more variables associated with (i) one or more operating parameters of the power plant and/or (ii) energy market prices.

6. The method of claim 1, wherein the obtaining, generating, assigning, selecting, and operating are performed at a first time point.

7. The method of claim 6, wherein the obtaining, generating, assigning, selecting, and operating are repeated at a second time point that is subsequent to the first time point.

8. The method of claim 7, wherein selecting the control algorithm at the second time point comprises updating the selection of the control algorithm from the control algorithm selected at the first time point, wherein operating the power plant at the second time point comprises operating the power plant in accordance with the updated selection of the control algorithm.

9. The method of claim 7, wherein operating the power plant comprises operating the power plant in accordance with the selected control algorithm after the first time point and before the second time point, without requiring additional energy production forecasting or generation of additional simulation results.

10. The method of claim 1, further comprising:
generating a graphical user interface (GUI) that permits a user to view the plurality of scores for the plurality of control algorithms; and
receiving a selection from the plurality of control algorithms as the control algorithm for operating the power plant.

11. The method of claim 1, wherein selecting the control algorithm comprises selecting the control algorithm responsive to determining the control algorithm has a highest score of the plurality of scores.

12. The method of claim 1, wherein the power plant is a renewable energy power plant that comprises (i) a renewable electrical energy generation resource and (ii) an electrical energy storage device that is configured to be charged with electric power produced by the renewable electrical energy generation resource and to discharge the electric power to an electric grid.

13. The method of claim 1, wherein assigning a score to each of the plurality of control algorithms comprises generating scores for the plurality of control algorithms based on a set of scoring criteria comprising one or more of the following: (i) a first scoring criterion based on an amount of energy or power delivered to a point of measurement; (ii) a second scoring criterion based on a state of charge of an electrical energy storage device at the power plant; or (iii) a third scoring criterion based on minimizing degradation or operating costs of the electrical energy storage device.

14. A system, comprising:
one or more computer processors operatively coupled to computer memory, wherein the one or more computer processors are configured by machine-readable instructions to:
obtain an energy production forecast for a forecast period;
generate a plurality of simulation results associated with simulated operation of the power plant for the forecast period, wherein the plurality of simulation results are generated by simulating operation of the power plant using a plurality of control algorithms and the energy production forecast, wherein each of the plurality of control algorithms correspond to different pre-set rules for applying control modes;
assign a score to each of the plurality of control algorithms based on the generated plurality of simulation results;
select a control algorithm from the plurality of control algorithms for the forecast period based on the assigned score for the control algorithm; and
operate the power plant in accordance with the control algorithm for a duration of the forecast period.

15. The system of claim 14, wherein the one or more computer processors are further configured to:
compare the assigned scores between each of the plurality of control algorithms; and
assign priorities to each of the plurality of control algorithms based on the assigned scores.

16. The system of claim 15, wherein the one or more computer processors are further configured to select the control algorithm by selecting the control algorithm responsive to the control algorithm having a highest priority of the assigned priorities.

17. One or more non-transitory computer storage media storing instructions that are operable, when executed by one or more computers, to cause said one or more computers to perform operations comprising:
obtaining an energy production forecast for a forecast period;

generating a plurality of simulation results associated with simulated operation of the power plant for the forecast period, wherein the plurality of simulation results are generated by simulating operation of the power plant using a plurality of control algorithms and the energy production forecast, wherein each of the plurality of control algorithms correspond to different pre-set rules for applying control modes;

assigning a score to each of the plurality of control algorithms based on the generated plurality of simulation results;

selecting a control algorithm from the plurality of control algorithms for the forecast period based on the assigned score for the control algorithm; and operating the power plant in accordance with the control algorithm for a duration of the forecast period.

18. The non-transitory computer storage media storing instructions of claim 17, the operations further comprising:

comparing the assigned scores between each of the plurality of control algorithms; and assigning priorities to each of the plurality of control algorithms based on the assigned scores.

19. The non-transitory computer storage media storing instructions of claim 18, wherein selecting the control algorithm comprises selecting the control algorithm responsive to the control algorithm having a highest priority of the assigned priorities.

20. The non-transitory computer storage media claim 17, wherein the plurality of control algorithms comprises a synthetic control algorithm, the synthetic control algorithm comprising stacked control modes having a priority order.

* * * * *